(12) United States Patent
Chen et al.

(10) Patent No.: US 12,219,513 B2
(45) Date of Patent: Feb. 4, 2025

(54) COMMUNICATION METHOD AND COMMUNICATION APPARATUS

(71) Applicant: HUAWEI TECHNOLOGIES CO., LTD., Shenzhen (CN)

(72) Inventors: Lei Chen, Beijing (CN); Bingzhao Li, Beijing (CN); Zonghui Xie, Shenzhen (CN); Haifeng Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 86 days.

(21) Appl. No.: 17/959,343

(22) Filed: Oct. 4, 2022

(65) Prior Publication Data

US 2023/0029283 A1 Jan. 26, 2023

Related U.S. Application Data

(63) Continuation of application No. PCT/CN2021/083866, filed on Mar. 30, 2021.

(30) Foreign Application Priority Data

Apr. 9, 2020 (CN) .......................... 202010275989.2

(51) Int. Cl.
*H04W 56/00* (2009.01)
*H04W 74/0833* (2024.01)

(52) U.S. Cl.
CPC ....... *H04W 56/003* (2013.01); *H04W 56/006* (2013.01); *H04W 74/0841* (2013.01)

(58) Field of Classification Search
CPC .......... H04W 56/0015; H04W 56/003; H04W 56/006; H04W 74/0833; H04W 74/0841;
(Continued)

(56) References Cited

U.S. PATENT DOCUMENTS 10,440,669 B2 * 10/2019 Blasco Serrano .... H04L 1/0001
2011/0286349 A1 * 11/2011 Tee ................... H04W 56/0045
370/252
(Continued)

FOREIGN PATENT DOCUMENTS

CN 101299749 A 11/2008
CN 107046449 A 8/2017
(Continued)

OTHER PUBLICATIONS

Chinese Notice of Allowance issued in corresponding Chinese Application No. 202010275989.2, dated Jan. 20, 2023, pp. 1-4.
(Continued)

*Primary Examiner* — Stephen J Clawson
(74) *Attorney, Agent, or Firm* — HAUPTMAN HAM, LLP

(57) ABSTRACT

A communication method and apparatus. A terminal device determines, based on first information received from a first network device, that a second network device has first time information, where the first time information is time information having precision that is higher than precision of second time information of the first network device. The terminal device obtains the first time information of the second network device based on the first information. The terminal device obtains high-precision time information to improve communication reliability.

13 Claims, 7 Drawing Sheets

(58) Field of Classification Search
CPC ........... H04W 74/0836; H04W 74/838; H04W 56/001
See application file for complete search history.

(56) References Cited

U.S. PATENT DOCUMENTS

| | | | | |
|---|---|---|---|---|
| 2013/0182583 | A1* | 7/2013 | Siomina | H04W 24/00 370/252 |
| 2013/0259008 | A1* | 10/2013 | Dinan | H04L 27/261 370/336 |
| 2013/0260735 | A1* | 10/2013 | Dinan | H04W 56/0005 455/418 |
| 2016/0127884 | A1* | 5/2016 | Kim | H04W 60/04 455/435.2 |
| 2017/0303218 | A1* | 10/2017 | Blasco Serrano | H04L 5/00 |
| 2019/0083179 | A1* | 3/2019 | Kheradpir | A61B 5/0077 |
| 2019/0373643 | A1 | 12/2019 | Tang | |
| 2020/0077352 | A1* | 3/2020 | Yu | H04W 56/0025 |
| 2020/0287969 | A1* | 9/2020 | Lv | H04J 3/0658 |
| 2022/0240207 | A1* | 7/2022 | Balasubramanian | H04W 56/0095 |
| 2022/0330181 | A1* | 10/2022 | Kolding | H04W 12/037 |

FOREIGN PATENT DOCUMENTS

| | | |
|---|---|---|
| CN | 107431960 A | 12/2017 |
| CN | 107749788 A | 3/2018 |
| CN | 108873668 A | 11/2018 |
| CN | 109743710 A | 5/2019 |
| CN | 110167132 A | 8/2019 |
| EP | 2640025 A1 | 9/2013 |
| JP | 2016152487 A | 8/2016 |
| JP | 2019033333 A | 2/2019 |

OTHER PUBLICATIONS

3GPP TSG-RAN WG2 #107bis, R2-1913060, Discussion on human-readable network name, China Telecom, Huawei, HiSilicon, Chongqing, China, Oct. 14-18, 2019, total 5 pages.
International Search Report issued in corresponding International Application No. PCT/CN2021/083866, mailed Jul. 2, 2021, pp. 1-8.
Chinese Office Action issued in corresponding Chinese Application No. 202010275989.2, dated Aug. 3, 2022, pp. 1-8.

* cited by examiner

COMMUNICATION METHOD AND COMMUNICATION APPARATUS

CROSS-REFERENCE TO RELATED APPLICATIONS

This application is a continuation of International Application No. PCT/CN2021/083866, filed on Mar. 30, 2021, which claims priority to Chinese Patent Application No. 202010275989.2, filed on Apr. 9, 2020. The disclosures of the aforementioned applications are hereby incorporated by reference in their entireties.

BACKGROUND

In a cellular mobile communication system, time synchronization between a receiving device and a sending device is a basis for ensuring normal communication. With expansion of cellular mobile communication services, there is a higher requirement for accuracy of time obtained by a communication device. For example, for a high-precision positioning service, a service with a low latency requirement, and various vertical industry applications such as vehicle-to-everything, an industrial Internet, and artificial intelligence, accurate time information ensures communication reliability, thereby ensuring safe driving of a vehicle or production safety in the industrial Internet. In an existing communication system, for example, a 4th generation (4th generation, 4G) mobile communication system or a 5th generation (5th generation, 5G) mobile communication system, a network device provides a timing service for a terminal device based on a system message. However, network devices of different versions provides different time precision for a terminal device. In response to a terminal device of a later version accessing a network device of an earlier version, the terminal device obtains time information of the accessed network device of the earlier version. Consequently, the terminal device cannot perform a service with high time precision. How to enable a communication device to obtain more accurate time information is a research hotspot for a person skilled in the art.

SUMMARY

Embodiments described herein provide a communication method and a communication apparatus, to obtain higher-precision time information, thereby improving communication reliability.

According to a first aspect, a communication method is provided. The method is performed by a terminal device or a module (such as a chip) configured on (or used in) the terminal device. The following uses an example in which the method is performed by a terminal device for description.

The method includes: receiving first information from a first network device, where the first information indicates that a second network device has first time information, and the first time information includes at least one of coordinated universal time UTC information, global positioning system GPS time information, or local time information; and receiving the first time information from the second network device based on the first information.

With reference to the first aspect, in some implementations of the first aspect, precision of the first time information is higher than precision of second time information, and the second time information is time information of the first network device.

Optionally, the first information indicates the terminal device to obtain the first time information of the second network device.

According to the foregoing solution, the terminal device receives time information from another network device based on an indication of the first network device to which the terminal device establishes a wireless connection. In this way, the terminal device obtains higher-precision time information, thereby improving communication reliability.

Optionally, the terminal device is simultaneously connected to both the first network device and the second network device in a dual connectivity manner. The first network device is a master network device (for example, a master base station), and the second network device is a secondary network device (for example, a secondary base station).

According to the foregoing solution, the terminal device receives time information from the secondary network device based on an indication of the master network device. In this way, the terminal device obtains higher-precision time information, thereby improving communication reliability.

With reference to the first aspect, in some implementations of the first aspect, the first information further includes one or more of the following information:

first indication information, indicating a first resource that carries the first time information;

second indication information, indicating whether the second network device broadcasts the first time information on a first resource;

third indication information, where the third indication information is configuration information of a request message, and the request message is used to request the first time information;

fourth indication information, indicating an identifier of the second network device and/or an identifier of a cell in which the second network device provides a service;

fifth indication information, indicating to receive the first time information by using dedicated signaling; or sixth indication information, indicating to request the first time information from the second network device by using dedicated signaling.

According to the foregoing solution, the first network device provides, based on the first information, assistance information for the terminal device to receive the first time information, so that the terminal device receives the first time information from the second network device. In this way, the terminal device obtains higher-precision time information, thereby improving communication reliability.

With reference to the first aspect, in some implementations of the first aspect, the first information includes scheduling information of at least one system message of the second network device, the scheduling information includes the first indication information and/or the second indication information, and a first system message in the at least one system message includes the first time information.

According to the foregoing solution, the second network device sends the first time information based on the system message, and the first information is scheduling information for the terminal device to provide the system message, so that the terminal device receives the first time information from the second network device. In this way, the terminal device obtains higher-precision time information, thereby improving communication reliability.

With reference to the first aspect, in some implementations of the first aspect, the first information includes the second indication information, and the receiving the first time information from the second network device based on the first information includes: receiving the first time information from the second network device in response to a result indicated by the second indication information being "yes".

According to the foregoing solution, the second indication information in the first information indicates that the second network device sends the first time information, for example, periodically send the first time information or send the first time information on the first resource indicated by the first indication information, and the terminal device receives the first time information from the second network device. In this way, the terminal device obtains higher-precision time information, thereby improving communication reliability.

With reference to the first aspect, in some implementations of the first aspect, in response to a result indicated by the second indication information being "no", the method further includes: sending third information to the second network device, where the third information is used to request the first time information, and the third information is carried in a message 3 of a random access process.

According to the foregoing solution, the second indication information in the first information indicates that the second network device does not periodically or actively send the first time information. The terminal device initiates the random access process, and send request information to the second network device in the message 3, to request the second network device to send the first time information. In this way, the terminal device obtains higher-precision time information, thereby improving communication reliability.

With reference to the first aspect, in some implementations of the first aspect, in response to a result indicated by the second indication information being "no", and the first information does not include the third indication information, the method further includes: sending third information to the second network device, where the third information is used to request the first time information, and the third information is carried in a message 3 of a random access process.

According to the foregoing solution, in response to the second indication information in the first information indicating that the second network device does not periodically or actively send the first time information, and a resource for the request message not being configured in the first information for the terminal device, the terminal device initiates the random access process, and send the request information to the second network device in the message 3, to request the second network device to send the first time information. In this way, the terminal device obtains higher-precision time information, thereby improving communication reliability.

With reference to the first aspect, in some implementations of the first aspect, in response to a result indicated by the second indication information being "no", and the first information including the third indication information, the method further includes: sending fourth information based on the third indication information, where the fourth information is the request message.

According to the foregoing solution, the second indication information in the first information indicates that the second network device does not periodically or actively send the first time information, and a resource for sending the request message is configured in the first information for the terminal device. The terminal device sends the request message by using the resource configured based on the third indication information, to request the second network device to send the first time information. In this way, the terminal device obtains higher-precision time information, thereby improving communication reliability.

With reference to the first aspect, in some implementations of the first aspect, the third indication information includes configuration information of a random access channel RACH resource and/or configuration information of a preamble, and the request message is the preamble that is sent on the RACH resource.

According to the foregoing solution, a dedicated resource that is for the request message and that is configured for the terminal device based on the third indication information is a resource of a message 1, and includes the RACH resource and the preamble. The terminal device generates the message 1 based on a configuration of the third indication information, to request the second network device to send the first time information. In this way, the terminal device obtains higher-precision time information, thereby improving communication reliability.

With reference to the first aspect, in some implementations of the first aspect, the method further includes: sending fifth information, where the fifth information is used to request the first time information.

With reference to the first aspect, in some implementations of the first aspect, the fifth information is carried on a signaling radio bearer 1.

According to the foregoing solution, the terminal device sends a request message to the first network device through the radio signaling bearer 1, so that after receiving the request message, the first network device notifies the second network device that the terminal device requests the first time information of the first network device. In this way, the terminal device obtains higher-precision time information, thereby improving communication reliability.

With reference to the first aspect, in some implementations of the first aspect, the fifth information is carried on a signaling radio bearer 3.

According to the foregoing solution, the terminal device sends a request message to the second network device through the radio signaling bearer 3, to request the second network device to send the first time information. In this way, the terminal device obtains higher-precision time information, thereby improving communication reliability.

According to a second aspect, a communication method is provided. The method is performed by a first network device or a module (such as a chip) configured on (or used in) the first network device. The following uses an example in which the method is performed by a first network device for description.

The method includes: receiving sixth information from a second network device, where the sixth information indicates that the second network device has first time information, or the sixth information indicates that precision of first time information of the second network device is higher than precision of second time information of the first network device, where the first time information includes at least one of coordinated universal time UTC information, global positioning system GPS time information, or local time information; and sending first information to a terminal device, where the first information indicates that the second network device has the first time information.

With reference to the second aspect, in some implementations of the second aspect, the sixth information and/or the first information include/includes one or more of the following information:

first indication information, indicating a first resource that carries the first time information;

second indication information, indicating whether the second network device broadcasts the first time information on a first resource;

third indication information, where the third indication information is configuration information of a request message, and the request message is used to request the first time information;

fourth indication information, indicating an identifier of the second network device and/or an identifier of a cell in which the second network device provides a service;

fifth indication information, indicating to receive the first time information by using dedicated signaling; or sixth indication information, indicating to request the first time information from the second network device by using dedicated signaling.

With reference to the second aspect, in some implementations of the second aspect, the first information includes scheduling information of at least one system message of the second network device, the scheduling information includes the first indication information and/or the second indication information, and a first system message in the at least one system message includes the first time information.

With reference to the second aspect, in some implementations of the second aspect, the third indication information includes configuration information of a random access channel RACH resource and/or configuration information of a preamble, and the request message is the preamble that is sent on the RACH resource.

With reference to the second aspect, in some implementations of the second aspect, the method further includes:

receiving fifth information from the terminal device, where the fifth information indicates requesting the first time information; and sending seventh information to the second network device, where the seventh information indicates that the terminal device requests the first time information.

With reference to the second aspect, in some implementations of the second aspect, the fifth information is carried on a signaling radio bearer 1.

According to a third aspect, a communication method is provided. The method is performed by a second network device or a module (such as a chip) configured on (or used in) the second network device. The following uses an example in which the method is performed by a second network device for description.

The method includes: sending sixth information to a first network device, where the sixth information indicates that the second network device has first time information, or the sixth information indicates that precision of first time information of the second network device is higher than precision of second time information of the first network device, where the first time information includes at least one of coordinated universal time UTC information, global positioning system GPS time information, or local time information; and sending the first time information to a terminal device.

With reference to the third aspect, in some implementations of the third aspect, the sixth information further includes one or more of the following information:

first indication information, indicating a first resource that carries the first time information;

second indication information, indicating whether the second network device broadcasts the first time information on a first resource;

third indication information, where the third indication information is configuration information of a request message, and the request message is used to request the first time information;

fourth indication information, indicating an identifier of the second network device and/or an identifier of a cell in which the second network device provides a service;

fifth indication information, indicating to receive the first time information by using dedicated signaling; or sixth indication information, indicating to request the first time information from the second network device by using dedicated signaling.

With reference to the third aspect, in some implementations of the third aspect, the sixth information includes the first indication information, and the sending the first time information to a terminal device includes:

sending the first time information on the first resource.

With reference to the third aspect, in some implementations of the third aspect, first information includes scheduling information of at least one system message of the second network device, the scheduling information includes the first indication information and/or the second indication information, and a first system message in the at least one system message includes the first time information.

With reference to the third aspect, in some implementations of the third aspect, first information includes the second indication information, and the sending the first time information to a terminal device includes:

sending the first time information to the terminal device in response to a result indicated by the second indication information being "yes".

With reference to the third aspect, in some implementations of the third aspect, in response to a result indicated by the second indication information being "no", the method further includes:

receiving third information from the terminal device, where the third information is used to request the first time information, and the third information is carried in a message 3 of a random access process.

With reference to the third aspect, in some implementations of the third aspect, in response to a result indicated by the second indication information being "no" and first information includes the third indication information, the method further includes:

receiving fourth information from the terminal device, where the fourth information is the request message.

With reference to the third aspect, in some implementations of the third aspect, the third indication information includes configuration information of a random access channel RACH resource and/or configuration information of a preamble, and the request message is the preamble that is sent on the RACH resource.

With reference to the third aspect, in some implementations of the third aspect, the method further includes:

receiving fifth information from the terminal device, where the fifth information is used to request the first time information.

With reference to the third aspect, in some implementations of the third aspect, the fifth information is carried on a signaling radio bearer 3.

According to a fourth aspect, a communication apparatus is provided. The apparatus is, for example, a terminal device or a chip disposed in the terminal device. The apparatus includes: a transceiver unit, configured to receive first information from a first network device, where the first information indicates that a second network device has first time information, and the first time information includes at least one of coordinated universal time UTC information, global positioning system GPS time information, or local time information; and a processing unit, configured to determine to receive the first time information from the second network device. The transceiver unit is further configured to receive the first time information from the second network device based on the first information.

With reference to the fourth aspect, in some implementations of the fourth aspect, precision of the first time information is higher than precision of second time information, and the second time information is time information of the first network device.

With reference to the fourth aspect, in some implementations of the fourth aspect, the first information further includes one or more of the following information:
  first indication information, indicating a first resource that carries the first time information;
  second indication information, indicating whether the second network device broadcasts the first time information on a first resource;
  third indication information, where the third indication information is configuration information of a request message, and the request message is used to request the first time information;
  fourth indication information, indicating an identifier of the second network device and/or an identifier of a cell in which the second network device provides a service;
  fifth indication information, indicating to receive the first time information by using dedicated signaling; or
  sixth indication information, indicating to request the first time information from the second network device by using dedicated signaling.

With reference to the fourth aspect, in some implementations of the fourth aspect, the first information includes scheduling information of at least one system message of the second network device, the scheduling information includes the first indication information and/or the second indication information, and a first system message in the at least one system message includes the first time information.

With reference to the fourth aspect, in some implementations of the fourth aspect, the first information includes the second indication information, and the transceiver unit is specifically configured to:
  receive the first time information from the second network device in response to a result indicated by the second indication information being "yes".

With reference to the fourth aspect, in some implementations of the fourth aspect, in response to a result indicated by the second indication information being "no", the transceiver unit is further configured to send third information to the second network device, where the third information is used to request the first time information, and the third information is carried in a message 3 of a random access process.

With reference to the fourth aspect, in some implementations of the fourth aspect, in response to a result indicated by the second indication information being "no", and the first information includes the third indication information, the transceiver unit is further configured to send fourth information based on the third indication information, where the fourth information is the request message.

With reference to the fourth aspect, in some implementations of the fourth aspect, the third indication information includes configuration information of a random access channel RACH resource and/or configuration information of a preamble, and the request message is the preamble that is sent on the RACH resource.

With reference to the fourth aspect, in some implementations of the fourth aspect, the transceiver unit is further configured to send fifth information, where the fifth information is used to request the first time information.

With reference to the fourth aspect, in some implementations of the fourth aspect, the fifth information is carried on a signaling radio bearer 1, or the fifth information is carried on a signaling radio bearer 3.

According to a fifth aspect, a communication apparatus is provided. The apparatus is, for example, a first network device or a chip disposed in the first network device. The apparatus includes: a transceiver unit, configured to receive sixth information from a second network device, where the sixth information indicates that the second network device has first time information, or the sixth information indicates that precision of first time information of the second network device is higher than precision of second time information of the first network device, where the first time information includes at least one of coordinated universal time UTC information, global positioning system GPS time information, or local time information; and
  a processing unit, configured to generate first information based on the sixth information, where the first information indicates that the second network device has the first time information.

The transceiver unit is further configured to send the first information to a terminal device.

With reference to the fifth aspect, in some implementations of the fifth aspect, the sixth information and/or the first information include/includes one or more of the following information:
  first indication information, indicating a first resource that carries the first time information;
  second indication information, indicating whether the second network device broadcasts the first time information on a first resource;
  third indication information, where the third indication information is configuration information of a request message, and the request message is used to request the first time information;
  fourth indication information, indicating an identifier of the second network device and/or an identifier of a cell in which the second network device provides a service;
  fifth indication information, indicating to receive the first time information by using dedicated signaling; or
  sixth indication information, indicating to request the first time information from the second network device by using dedicated signaling.

With reference to the fifth aspect, in some implementations of the fifth aspect, the first information includes scheduling information of at least one system message of the second network device, the scheduling information includes the first indication information and/or the second indication information, and a first system message in the at least one system message includes the first time information.

With reference to the fifth aspect, in some implementations of the fifth aspect, the third indication information includes configuration information of a random access channel RACH resource and/or configuration information of a preamble, and the request message is the preamble that is sent on the RACH resource.

With reference to the fifth aspect, in some implementations of the fifth aspect, the transceiver unit is further configured to receive fifth information from the terminal device, where the fifth information indicates requesting the first time information; and the transceiver unit is further configured to send seventh information to the second network device, where the seventh information indicates that the terminal device requests the first time information.

With reference to the fifth aspect, in some implementations of the fifth aspect, the fifth information is carried on a signaling radio bearer 1.

According to a sixth aspect, a communication apparatus is provided. The apparatus is, for example, a second network device or a chip disposed in a second network device. The apparatus includes: a processing unit, configured to generate sixth information, where the sixth information indicates that the second network device has first time information, or the sixth information indicates that precision of first time information of the second network device is higher than precision of second time information of a first network device, where the first time information includes at least one of coordinated universal time UTC information, global positioning system GPS time information, or local time information; and a transceiver unit, configured to send the sixth information to the first network device. The transceiver unit is further configured to send the first time information to a terminal device.

With reference to the sixth aspect, in some implementations of the sixth aspect, the sixth information further includes one or more of the following information:
first indication information, indicating a first resource that carries the first time information;
second indication information, indicating whether the second network device broadcasts the first time information on a first resource;
third indication information, where the third indication information is configuration information of a request message, and the request message is used to request the first time information;
fourth indication information, indicating an identifier of the second network device and/or an identifier of a cell in which the second network device provides a service;
fifth indication information, indicating to receive the first time information by using dedicated signaling; or
sixth indication information, indicating to request the first time information from the second network device by using dedicated signaling.

With reference to the sixth aspect, in some implementations of the sixth aspect, the sixth information includes the first indication information, and the transceiver unit is specifically configured to send the first time information on the first resource.

With reference to the sixth aspect, in some implementations of the sixth aspect, first information includes scheduling information of at least one system message of the second network device, the scheduling information includes the first indication information and/or the second indication information, and a first system message in the at least one system message includes the first time information.

With reference to the sixth aspect, in some implementations of the sixth aspect, the first information includes the second indication information. In response to a result indicated by the second indication information being "yes", the transceiver unit is further configured to send the first time information to the terminal device.

With reference to the sixth aspect, in some implementations of the sixth aspect, in response to a result indicated by the second indication information being "no", the transceiver unit is further configured to receive third information from the terminal device, where the third information is used to request the first time information, and the third information is carried in a message 3 of a random access process.

With reference to the sixth aspect, in some implementations of the sixth aspect, in response to a result indicated by the second indication information being "no", and first information includes the third indication information, the transceiver unit is further configured to receive fourth information from the terminal device, where the fourth information is the request message.

With reference to the sixth aspect, in some implementations of the sixth aspect, the third indication information includes configuration information of a random access channel RACH resource and/or configuration information of a preamble, and the request message is the preamble that is sent on the RACH resource.

With reference to the sixth aspect, in some implementations of the sixth aspect, the transceiver unit is further configured to receive fifth information from the terminal device, where the fifth information is used to request the first time information.

With reference to the sixth aspect, in some implementations of the sixth aspect, the fifth information is carried on a signaling radio bearer 3.

According to a seventh aspect, a communication apparatus is provided, and includes a processor. The processor is configured to execute instructions in a memory, to implement the method in the first aspect and any implementation of the first aspect. Optionally, the communication apparatus further includes a memory, and the processor is coupled to the memory. Optionally, the communication apparatus further includes a communication interface, and the processor is coupled to the communication interface.

In an implementation, the communication apparatus is a terminal device. In response to the communication apparatus being the terminal device, the communication interface is a transceiver or an input/output interface.

In another implementation, the communication apparatus is a chip disposed in a terminal device. In response to the communication apparatus being the chip disposed in the terminal device, the communication interface is an input/output interface.

Optionally, the transceiver is a transceiver circuit. Optionally, the input/output interface is an input/output circuit.

According to an eighth aspect, a communication apparatus is provided, and includes a processor. The processor is configured to execute instructions in a memory, to implement the method in the second aspect and any implementation of the second aspect. Optionally, the communication apparatus further includes a memory, and the processor is coupled to the memory. Optionally, the communication apparatus further includes a communication interface, and the processor is coupled to the communication interface.

In an implementation, the communication apparatus is a first network device. In response to the communication apparatus being the first network device, the communication interface is a transceiver or an input/output interface.

In another implementation, the communication apparatus is a chip disposed in a first network device. In response to the communication apparatus being the chip disposed in the first network device, the communication interface is an input/output interface.

Optionally, the transceiver is a transceiver circuit. Optionally, the input/output interface is an input/output circuit.

According to a ninth aspect, a communication apparatus is provided, and includes a processor. The processor is configured to execute instructions in a memory, to implement the method in the third aspect and any implementation of the third aspect. Optionally, the communication apparatus further includes a memory, and the processor is coupled to the memory. Optionally, the communication apparatus further includes a communication interface, and the processor is coupled to the communication interface.

In an implementation, the communication apparatus is a second network device. In response to the communication apparatus being the second network device, the communication interface is a transceiver or an input/output interface.

In another implementation, the communication apparatus is a chip disposed in a second network device. In response to the communication apparatus being the chip disposed in the second network device, the communication interface is an input/output interface.

Optionally, the transceiver is a transceiver circuit. Optionally, the input/output interface is an input/output circuit.

According to a tenth aspect, a processor is provided, and includes an input circuit, an output circuit, and a processing circuit. The processing circuit is configured to: receive a signal by using the input circuit, and transmit the signal by using the output circuit, so that the processor performs the method according to any one of the first aspect to the third aspect and the implementations of the first aspect to the third aspect.

In at least one embodiment, the processor is one or more chips, the input circuit is an input pin, the output circuit is an output pin, and the processing circuit is a transistor, a gate circuit, a trigger, any logic circuit, or the like. An input signal received by the input circuit is received and input by, for example, but not limited to, a receiver, a signal output by the output circuit is output to, for example, but not limited to, a transmitter and transmitted by the transmitter, and the input circuit and the output circuit is a same circuit, where the circuit is used as the input circuit and the output circuit at different moments. Specific implementations of the processor and the various circuits are not limited in embodiments described herein.

According to an eleventh aspect, a communication apparatus is provided, and includes a processor and a memory. The processor is configured to execute instructions stored in the memory, and receives a signal via a receiver and send a signal via a transmitter, to implement the method in the first aspect or the third aspect and any implementation of the first aspect or the third aspect.

Optionally, there are one or more processors, and there are one or more memories.

Optionally, the memory is integrated with the processor, or the memory and the processor are disposed separately.

In at least one embodiment, the memory is a non-transitory (non-transitory) memory, such as a read-only memory (read-only memory, ROM). The memory and the processor is integrated into one chip, or is separately disposed in different chips. A type of the memory and a manner in which the memory and the processor are disposed are not limited in embodiments described herein.

A related data exchange process such as sending of indication information is a process of outputting the indication information from the processor, and receiving of capability information is a process of receiving the input capability information by the processor. Specifically, data output by the processor is output to the transmitter, and input data received by the processor is from the receiver. The transmitter and the receiver is collectively referred to as a transceiver.

The processing apparatus in the eleventh aspect is one or more chips. The processor in the processing apparatus is implemented by using hardware, or is implemented by using software. In response to the processor being implemented by using hardware, the processor is a logic circuit, an integrated circuit, or the like. In response to the processor being implemented by using software, the processor is a general-purpose processor, and is implemented by reading software code stored in the memory. The memory is integrated into the processor, or is located outside the processor and exist independently.

According to a twelfth aspect, a computer program product is provided. The computer program product includes a computer program (which is also referred to as code or instructions). In response to the computer program being run, a computer is enabled to perform the method in any one of the first aspect to the third aspect or the implementations of the first aspect to the third aspect.

According to a thirteenth aspect, a computer-readable medium is provided. The computer-readable medium stores a computer program (which is also referred to as code or instructions). In response to the computer program being run, a computer is enabled to perform the method in any one of the first aspect to the third aspect or the implementations of the first aspect to the third aspect.

According to a fourteenth aspect, a communication system is provided. The communication system includes the foregoing one or more terminal devices and at least two network devices including the foregoing first network device and the foregoing second network device.

DESCRIPTION OF EMBODIMENTS

The following describes technical solutions of at least one embodiment with reference to accompanying drawings.

The technical solutions in at least one embodiment is applied to various communication systems, for example, a global system for mobile communications (global system for mobile communications, GSM), a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD), a universal mobile telecommunications system (universal mobile telecommunications system, UMTS), a worldwide interoperability for microwave access (worldwide interoperability for microwave access, WiMAX) communication system, a 5th generation (5th generation, 5G) system, a new radio (new radio, NR) system, a vehicle-to-everything (Vehicle-to-X, V2X) system, where the V2X system includes, for example, a vehicle-to-network (vehicle-to-network, V2N) system, a vehicle-to-vehicle (vehicle-to-vehicle, V2V) system, a vehicle-to-infrastructure (vehicle-to-infrastructure, V2I) system, a vehicle-to-pedestrian (vehicle-to-pedestrian, V2P) system, and the like, a long term evolution-vehicle (Long Term Evolution-Vehicle, LTE-V) system, a machine type communication (machine type communication, MTC) system, an Internet of Things (Internet of Things, IoT) system, a long-term evolution-machine (Long Term Evolution-Machine, LTE-M) system, and a machine to machine (Machine to Machine, M2M) system.

Figure 1:
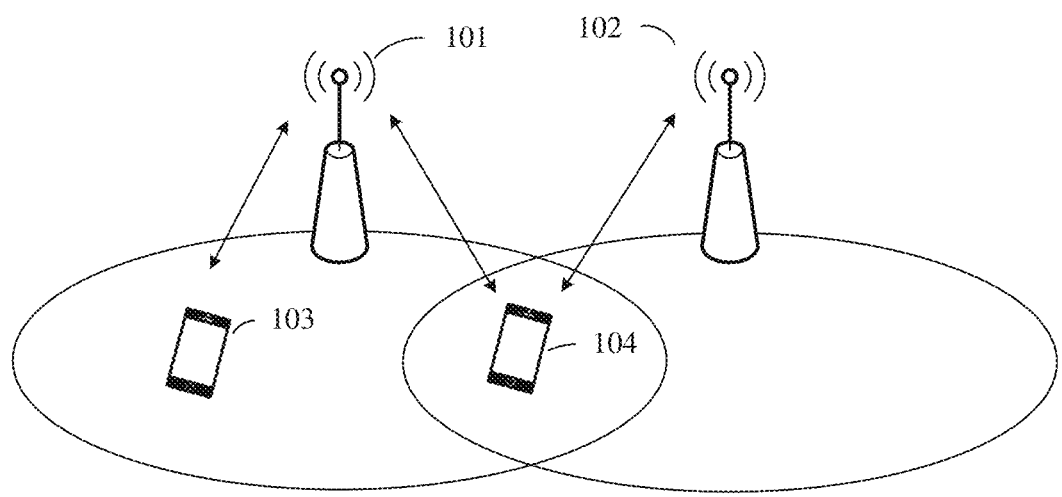
FIG. 1 is a schematic diagram of an example of a communication system according to at least one embodiment.

FIG. 1 is a schematic diagram of a wireless communication system 100 according to at least one embodiment.

The wireless communication system according to at least one embodiment includes at least two network devices, for example, the network devices 101 and 102 in the wireless communication system 100 shown in FIG. 1. The wireless communication system applicable to embodiments described here further includes at least one terminal device, for example, the terminal devices 103 and 104 in the wireless communication system 100 shown in FIG. 1. The at least one terminal device establishes connections with the at least two network devices. For example, the terminal device 104 establishes connections with both the network devices 101 and 102 in a dual connectivity (dual connectivity, DC) manner. The terminal device 104 obtains time information of a master network device (which is also referred to as a master base station). In response to precision of time information of a secondary network device (which is also referred to as a secondary base station) being higher than that of the master network device, the terminal device 104 obtains the time information of the secondary network device based on first information sent by the master network device (namely, an example of a first network device) by applying the method provided in at least one embodiment. The at least one terminal device establishes a connection with one of the at least two network devices, and does not establish a connection with another network device. For example, the terminal device 103 establishes a connection with the network device 101, but does not establish a connection with the network device 102, in other words, the network device 102 is not in a connected mode (connected mode). In response to precision of time information of the network device 102 being higher than precision of time information of the network device 101, the terminal device 103 obtains, based on first information sent by the network device 101 (namely, an example of the first network device), the time information of the network device 102 by applying the method provided in at least one embodiment. For example, the terminal device 103 receives, based on the first information, the time information on a first resource on which the network device 102 sends the time information; or the terminal device requests, in a message 1 (message 1, msg 1) or a message 3 (message 3, msg 3) in a random access process indicated by the terminal device 103 to the network device 102, the network device 102 to send first time information. However, embodiments described herein are not limited thereto.

The terminal device in at least one embodiment is also referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal device in at least one embodiment is a mobile phone (mobile phone), a tablet computer (pad), a computer having a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal device in a 5G network, a terminal device in a future evolved public land mobile network (public land mobile network, PLMN), or the like.

The wearable device is also referred to as a wearable intelligent device, and is a general term of wearable devices such as glasses, gloves, watches, clothes, and shoes that are developed by applying wearable technologies in intelligent designs of daily wear. The wearable device is a portable device that is directly worn on the body or integrated into clothes or an accessory of a user. The wearable device is not only a hardware device, but also implements a powerful function through software support, data exchange, and cloud interaction. Generalized wearable intelligent devices include full-featured and large-size devices that implements complete or partial functions without depending on smartphones, for example, smart watches or smart glasses, and devices that focus on one type of function and that works with another device such as a smartphone, for example, various smart bands or smart accessories for monitoring physical signs.

In addition, the terminal device is alternatively a terminal device in an internet of things (internet of things, IoT) system. An IoT is an important part of future information technology development. A main technical feature of the IoT is to connect things to a network by using a communication technology, to implement an intelligent network for human-machine interconnection and thing-thing interconnection.

A form of the terminal device is not limited in embodiments described here.

The network device in at least one embodiment is any device having a wireless transceiver function. The device includes but is not limited to: an evolved NodeB (evolved NodeB, eNB), a radio network controller (Radio Network Controller, RNC), a NodeB (NodeB, NB), a base station controller (Base Station Controller, BSC), a base transceiver station (Base Transceiver Station, BTS), a home base station (for example, a home evolved NodeB, or a home NodeB, HNB), a baseband unit (BaseBand Unit, BBU), an access point (Access Point, AP), a wireless relay node, a wireless backhaul node, a transmission point (transmission point, TP), or a transmission reception point (transmission reception point, TRP) in a wireless fidelity (Wireless Fidelity, Wi-Fi) system, and the like. Alternatively, the device is a gNB or a transmission point (TRP or TP) in a 5G system (for example, an NR system), one antenna panel or a group of antenna panels (including a plurality of antenna panels) of a base station in a 5G system, or a network node, for example, a baseband unit (BBU) or a distributed unit (distributed unit, DU), that constitutes a gNB or a transmission point.

In some deployments, a gNB includes a centralized unit (centralized unit, CU) and a DU. The gNB further includes an active antenna unit (active antenna unit, AAU for short). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling is also considered as being sent by the DU or sent by the DU and the AAU. The network device is a device including one or more of a CU node, a DU node, and an AAU node. In addition, the CU is classified into a network device in an access network (access network, AN), or the CU is classified into a network device in a core network (core network, CN). This is not limited in embodiments described herein.

The network device serves a cell, and the terminal device communicates with the cell by using a transmission resource (for example, a frequency domain resource or a spectrum resource) allocated by the network device. The cell belongs to a macro base station (for example, a macro eNB or a macro gNB), or belongs to a base station corresponding to a small cell (small cell). The small cell herein includes a metro cell (metro cell), a micro cell (micro cell), a pico cell (pico cell), a femto cell (femto cell), and the like. These small cells have characteristics of small coverage and low transmit power, and are applicable to providing a high-rate data transmission service.

To facilitate understanding of at least one embodiment described herein, terms are first briefly described.

1. Dual Connectivity (Dual Connectivity, DC)

DC means that a terminal device is simultaneously connected to two network devices (for example, simultaneously connected to two base stations), so that transmission reliability and a transmission rate is effectively improved. One network device is a master node (master node, MN), or referred to as a master base station, a master station, or a master network device. The other network device is a secondary node (secondary node, SN), or referred to as a secondary base station, a secondary station, or a secondary network device. Base station has serving cells of several pieces of UE. The master base station and the secondary base station are connected through a network interface, and at least the master base station is connected to a core network. Dual connectivity in which a master base station is an LTE base station, and a secondary base station is an NR base station is referred to as EN-DC. Dual connectivity in which a master base station is an NR base station, and a secondary base station is an LTE base station is referred to as NE-DC. Dual connectivity in which both a master base station and a secondary base station are NR base stations is referred to as NR-DC.

2. Signaling Radio Bearer (Signaling Radio Bearer, SRB)

An SRB is a radio bearer (radio bearer, RB) used to transmit RRC signaling and non-access stratum (non-access stratum, NAS) signaling, and includes an SRB 0, an SRB 1, an SRB 2, and an SRB 3. The SRB 0 uses a common control channel (common control channel, CCCH), while the SRB 1, the SRB 2, and the SRB 3 use a dedicated control channel (dedicated control channel, DCCH). The SRB 2 is used to carry NAS signaling. The SRB 1 also transmits the NAS signaling before the SRB 2 is set up. In a DC scenario, the SRB 0, the SRB 1, and the SRB 2 are used for signaling transmission between a terminal device and a master base station. The SRB 3 is used for signaling transmission between the terminal device and a secondary base station.

The following describes in detail a sidelink communication method provided in embodiments described herein with reference to accompanying drawings.

Figure 2:
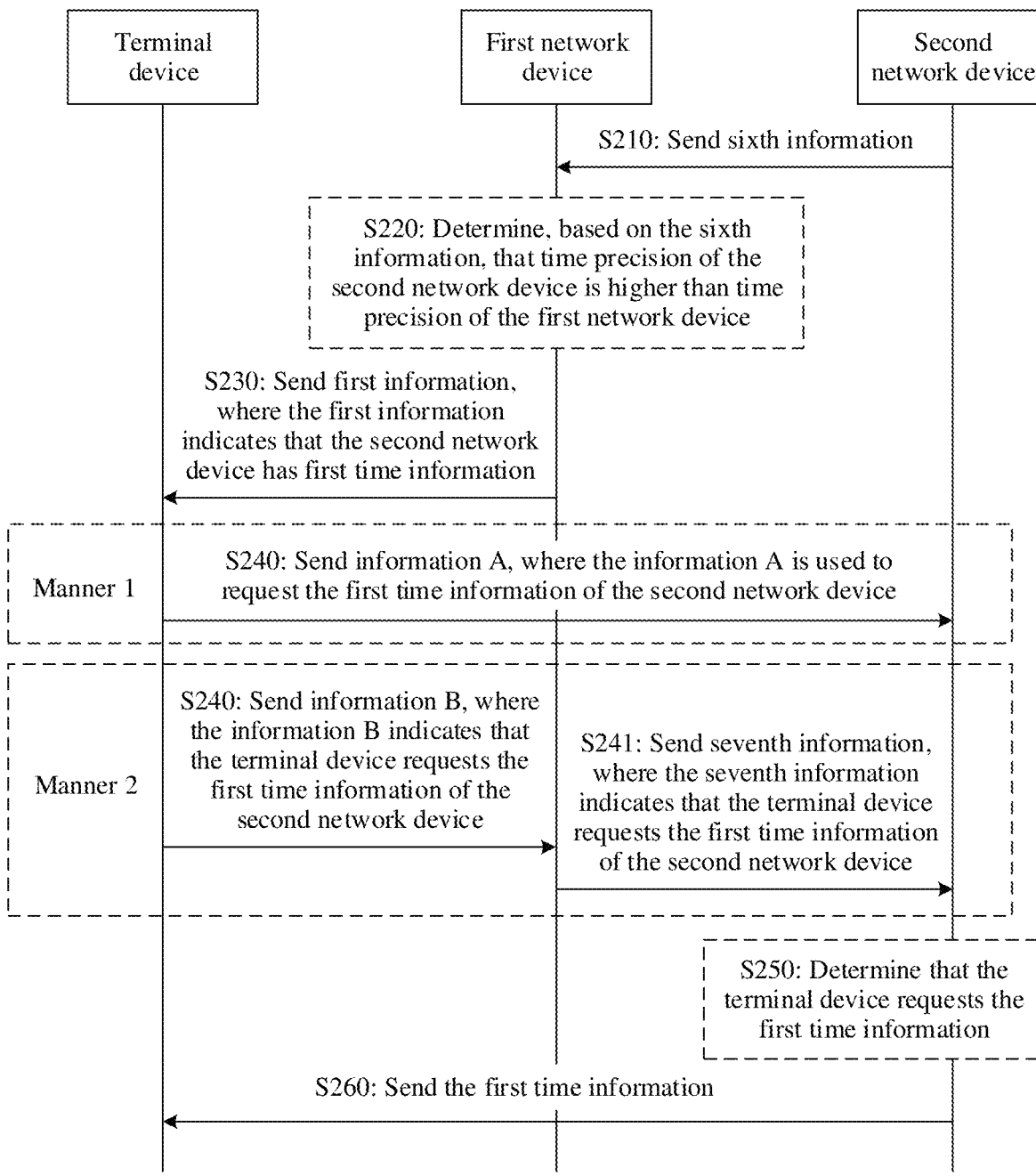
FIG. 2 is an example flowchart of a method for receiving and sending information provided in at least one embodiment.

FIG. 2 is a schematic flowchart of a method for receiving and sending information provided in at least one embodiment.

S210: A second network device sends sixth information to a first network device.

The first network device receives the sixth information from the second network device.

In an implementation, the sixth information indicates that the second network device has first time information.

By way of example, and not limitation, the first time information includes at least one of coordinated universal time (coordinated universal time, UTC) information, global positioning system (global positioning system, GPS) time information, or local time information of the second network device.

Optionally, that the second network device has the first time information indicates that a terminal device served by the first network device obtains the first time information from the second network device.

In another implementation, the sixth information indicates that precision of the first time information of the second network device is higher than precision of second time information, where the second time information is time information of the first network device.

In at least one embodiment, precision of time information of the network device (for example, the first network device or the second network device) is understood as precision of time information that is indicated by the second network device to the terminal device. For example, the precision or a unit is 10 milliseconds ms, 1 ms, 1 microsecond µs, 1 nanosecond ns, or the like. However, embodiments described herein are not limited thereto.

Optionally, the sixth information includes access technology type information of the second network device, and a version of the second network device is later than a version of the first network device. Optionally, a protocol specifies precision of time information that is provided by a network device of a version for a terminal device. The first network device determines, based on the access technology type information provided by the second network device, whether the precision of the first time information of the second network device is higher than the precision of the time information of the first network device.

For example, the access technology type information indicates that the second network device is a network device in a 4th generation (4th generation, 4G) mobile communication system or a network device in a 5G mobile communication system. However, embodiments described herein are not limited thereto.

Optionally, the sixth information includes version information of the second network device.

For example, the version information indicates a version of a communication standard supported by the second network device, for example, a version (for example, a version 16 or a version 17) of a standard specified by the 3rd generation partnership project (3rd generation partnership project, 3GPP). However, embodiments described herein are not limited thereto.

Optionally, the sixth information includes a 1-bit indicator bit. In response to the indicator bit indicating "0", the precision of the first time information is higher than the precision of the second time information; or in response to the indicator bit indicating "1", the precision of the first time information is lower than the precision of the second time information. Alternatively, by contrast, in response to the indicator bit indicating "1", the precision of the first time information is higher than the precision of the second time information; or in response to the indicator bit indicating "0", the precision of the first time information is lower than the precision of the second time information.

In another implementation, the sixth information indicates a unit or precision of the first time information of the second network device.

For example, the precision of time information that is indicated by the second network device to the terminal device is 1 ms. The sixth information indicates that the precision of the first time information is 1 ms.

Optionally, the sixth information includes the first time information of the second network device. In other words, the sixth information directly indicates the first time information of the second network device, and the first network device obtains the first time information based on the sixth information.

By way of example, and not a limitation, the sixth message is carried in an X2 interface setup message or an Xn interface setup message.

Optionally, the sixth information includes but is not limited to one or more of the following information:

first indication information, indicating a first resource on which the second network device sends second information, where the second information includes the first time information; in other words, the first indication information indicates a first resource that carries the first time information;

second indication information, indicating whether the second network device broadcasts the first time information on a first resource;

third indication information, where the third indication information is configuration information of a request message, and the request message is used to request the first time information;

fourth indication information, indicating an identifier of the second network device and/or an identifier of a cell in which the second network device provides a service;

fifth indication information, indicating to receive the first time information by using dedicated signaling; or sixth indication information, indicating to request the first time information by using dedicated signaling.

The second network device notifies, based on the first indication information, the first network device of the first resource on which the second network device sends the first time information. In response to the sixth information including the first indication information, after receiving the first indication information via the first network device, the terminal device determines the first resource based on the first indication information and receive the first time information on the first resource.

Optionally, in response to the sixth information including the first indication information, the sixth information further includes the second indication information. The second information indicates whether the second network device sends the first time information on the first resource indicated by the first indication information, so that after receiving the second indication information via the first network device, the terminal device determines whether the second network device sends the first time information on the first resource. In response to the second network device not sending the first time information on the first resource, the terminal device sends the request message, to request the first network device to send the first time information, so that the terminal device obtains the first time information on the first resource. For at least one embodiment, refer to related descriptions below. However, embodiments described herein are not limited thereto.

Optionally, the sixth information includes the fourth indication information, so that after the first network device receives the fourth indication information or after the terminal device receives the fourth indication information via the first network device, the terminal device or the first network device determines an information source based on the identifier of the second network device and/or the identifier of the cell in which the second network device provides a service.

Optionally, the sixth information includes the fifth indication information and/or the sixth indication information. After receiving the first information via the first network device, the terminal device determines, depending on whether the first information includes the fifth indication information and/or the sixth indication information, whether to receive or request the first time information by using the dedicated signaling. For at least one embodiment, refer to related descriptions below. However, embodiments described herein are not limited thereto.

According to the foregoing solution, the second network device provides assistance information for the terminal device to receive the first time information, so that the terminal device receives the first time information from the second network device. In this way, the terminal device obtains higher-precision time information, thereby improving communication reliability.

Optionally, in S220, the first network device determines, based on the sixth information, that the precision of the time information of the second network device is higher than the precision of the time information of the first network device.

In an implementation, the first network device determines, based on local information or interaction information (for example, version information) of the second network device, that the precision of the first time information of the second network device is higher than the precision of the time information of the first network device.

In another implementation, the sixth information indicates that the precision of the first time information of the second network device is higher than the precision of the time information of the first network device. The first network device determines, based on the received sixth information, that the precision of the first time information is higher than the precision of the time information of the first network device.

In another implementation, the sixth information indicates the access technology type information of the second network device. The first network device determines, based on the access technology type information of the second network device, that the version of the second network device is later than the version of the first network device. Further, the terminal device determines that the precision of the first time information of the second network device is higher than the precision of the time information of the second network device.

Optionally, the sixth information includes the precision or the unit of the first time information.

In other words, the sixth information includes the precision or the unit of the time information that is indicated by the second network device to the terminal device. After receiving the sixth information, the first network device compares a unit or precision of time information that is indicated by the first network device to the terminal device with the unit or precision that is indicated by the second network device to the terminal device, to determine that the precision of the time information of the second network device is higher than time precision of the first network device.

For example, the precision of the time information of the first network device is 10 ms. The sixth information indicates that the precision of the first time information is 1 ms. After receiving the sixth information, the first network device determines that the precision of the first time information is higher than the precision of the time information of the first network device.

S230: The first network device sends first information to the terminal device.

The first information indicates that the second network device has the first time information, or the first information indicates the terminal device to obtain the first time information of the second network device.

The terminal device receives the first information from the first network device. After receiving the sixth information sent by the second network device, the first network device generates the first information based on the sixth information and sends the first information to the terminal device. The first information notifies the terminal device that the second network device has the first time information, or the first information indicates the terminal device to obtain the time information of the second network device.

Optionally, the first information includes but is not limited to one or more of the following information:
   first indication information, indicating a first resource on which the second network device sends second information, where the second information includes the first time information; in other words, the first indication information indicates a first resource that carries the first time information;
   second indication information, indicating whether the second network device broadcasts the first time information on a first resource;
   third indication information, where the third indication information is configuration information of a request message, and the request message is used to request the first time information;
   fourth indication information, indicating an identifier of the second network device and/or an identifier of a cell in which the second network device provides a service;
   fifth indication information, indicating to receive the first time information by using dedicated signaling; or
   sixth indication information, indicating to request the first time information by using dedicated signaling.

For implementations of the foregoing indication information, refer to the descriptions in S210 and embodiments described herein. For brevity, details are not described herein.

In at least one embodiment, the first information includes the first indication information. After receiving the first information, the terminal device performs S260 to receive the first time information sent by the second terminal device on the first resource indicated by the first indication information.

In at least one embodiment, the terminal device determines to send the request message based on the first information, where the request message is used to request the second network device to send the first time information.

In at least one embodiment, the terminal device requests, in but not limited to the following two manners, the second network device to send the first time information.

Manner 1

S240: The terminal device sends information A to the second network device, where the information A is used to request the first time information of the second network device.

The second network device receives the information A from the terminal device.

In an implementation, the terminal device is simultaneously connected to both the first network device and the second network device. For example, the terminal device is simultaneously connected to both the first network device and the second network device in a dual connectivity manner. The second network device is a secondary network device (which is also referred to as a secondary station or a secondary base station) in dual connectivity.

By way of example, and not limitation, the terminal device sends the information A (namely, an example of fifth information) to the second network device through a signaling radio bearer (signaling radio bearer, SRB) 3. In other words, the information A is carried on an SRB 3 of the terminal device.

Optionally, the first information includes the sixth indication information, where the sixth indication information indicates the terminal device to request the first time information from the second network device by using the dedicated signaling. After the terminal device receives the first information including the sixth indication information, the terminal device sends the information A to the second network device through the SRB 3, to request the second network device to send the first time information. In other words, the information A is the dedicated signaling sent by the terminal device.

In another implementation, the information A is a message 3 (msg 3) in a random access process.

For example, in response to the terminal device determining to request the first time information from the second network device after receiving the first information sent by the first network device, the terminal device initiates a random access process to the second network device, and sends the information A in the msg 3 of the random access process, to request the first time information of the second network device. However, embodiments described herein are not limited thereto.

In another implementation, the first information includes the third indication information, where the third indication information includes the configuration information of the request message. The terminal device sends the information A (namely, an example of fourth information) to the second network device based on the third indication information, to request the first time information of the second network device. For example, the third indication information indicates a second resource on which the terminal device sends the request message. The terminal device sends the information A on the second resource, to request the time information of the second network device. However, embodiments described herein are not limited thereto.

Optionally, the third indication information includes configuration information of a random access channel (random access channel, RACH) resource and/or configuration information of a preamble.

After receiving the first information, the terminal device sends the information A based on the third indication information, where the information A is the preamble sent on the RACH resource configured based on the third indication information. In other words, the information A is a dedicated message 1 (msg 1) that is in a random access process and that is used to request the first time information of the second network device.

For example, the first network device sends the first information to the terminal device, and configures, for the terminal device in the third indication information of the first information, the RACH resource and the preamble that are dedicated for sending request information. The terminal device requests the first time information from the second network device by sending the preamble on the RACH resource. After receiving, on the RACH resource, the preamble sent by the terminal device, the second network device determines that the terminal device requests the time information of the second network device. However, embodiments described herein are not limited thereto.

Figure 3:
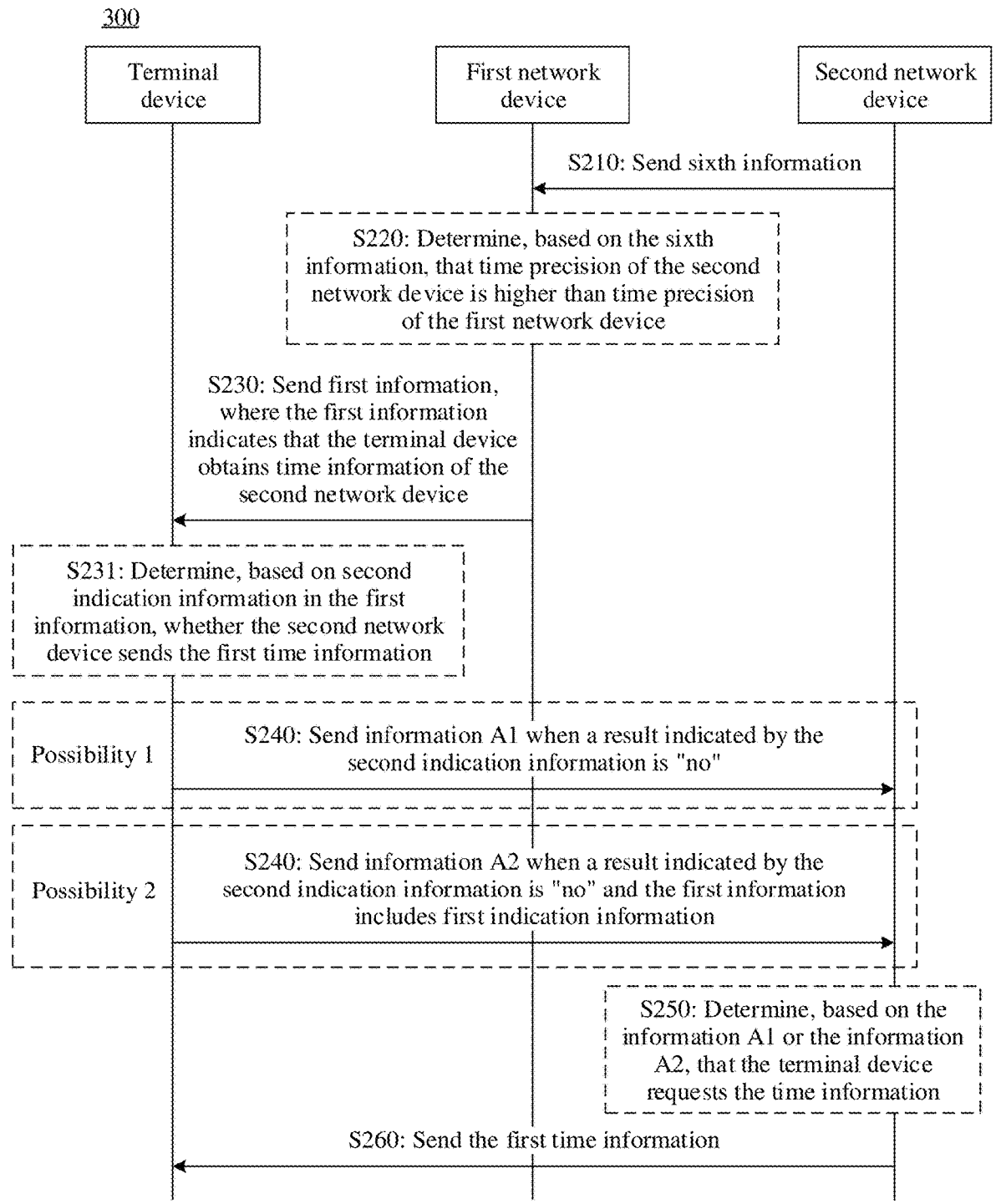
FIG. 3 is another example flowchart of a method for receiving and sending information provided in at least one embodiment.

In another implementation, the first information includes the first indication information and/or the second indication information. The terminal device determines, based on the first indication information and/or the second indication information, steps for obtaining the first time information of the second network device. The schematic flowchart shown in FIG. 3 is an example. For a part that is in the flowchart shown in FIG. 3 and that is the same as or similar to a part in FIG. 2, refer to the descriptions of FIG. 2. For brevity, details are not described herein again.

In this embodiment, S231 is further performed after S230. In S231, the terminal device determines, based on the second indication information in the first information, whether the second network device sends the first time information.

Alternatively, the terminal device determines, based on the second indication information in the first information, whether the second network device sends the second information, where the second information includes the first time information.

Optionally, the second indication information indicates that the second network device sends the second information. For example, the second network device periodically sends the second information including the first time information, or the second network device sends the second information on an upcoming first resource. However, embodiments described herein are not limited thereto. In response to a result indicated by the second indication information being "yes", the terminal device determines, based on the first indication information, the first resource on which the second network device sends the second information, and S260 is performed, in other words, the terminal device receives the second information on the first resource, to obtain the first time information of the second network device.

In at least one embodiment, the terminal device performs Possibility 1 in FIG. 3.

S240: Send information A1 in response to a result indicated by the second indication information being "no".

The second indication information indicates that the second network device does not send the second information. In other words, the second indication information indicates that the second network device does not send the first time information (where for example, the second network device does not periodically send the second information, or the second network device does not actively send the second information, but embodiments described herein are not limited thereto). The terminal device sends information A1 (namely, an example of third information) to the second network device.

That is, in response to the result indicated by the second indication information being "no", the terminal device sends the information A1 to the second network device, where the information A1 is used to request the first time information of the second network device. For example, the information A1 is a msg 3 in a random access process. To be specific, after determining that the second network device does not send the first time information, the terminal device initiates a random access process to the second network device. The terminal device first sends a msg 1 to the second network device, and then sends the msg 3 to the second network device after receiving a random access response message (namely, a msg 2) sent by the second network device. The msg 3 includes the information A1 for requesting the first time information from the second network device. However, embodiments described herein are not limited thereto.

Optionally, Possibility 1 is that the terminal device sends the information A1 in response to the result indicated by the second indication information being "no" and the first information not including the first indication information. To be specific, after receiving the first information, the terminal device determines, based on the result indicated by the second indication information, that the second network device periodically or actively sends the first time information. Further, the terminal device determines whether the first information includes the second indication information. In response to the first information not including the second indication information, the terminal device sends the information A1 to the second network device. That is, in response to the second indication information indicating that the second network device does not send the first time information, and the first information does not include configuration information of request information (where in other words, a resource to send the request information is not configured in the first information for the terminal device), the terminal device requests the first time information of the second network device by sending the information A1 to the second network device.

In at least one embodiment, the terminal device performs Possibility 2 in FIG. 3.

S240: Send information A2 in response to a result indicated by the second indication information being "no" and the first information includes the first indication information.

In response to the result indicated by the second indication information being "no", and the first information includes the third indication information, the terminal device sends the information A2 (namely, an example of fourth information) based on the third indication information, where the information A2 is used to request the first time information of the second network device. That is, in response to the second indication information indicating that the second network device does not send the first time information, and a resource to send request information being configured in the third indication information in the first information for the terminal device, after receiving the first information, the terminal device sends the request information (namely, the information A2) based on the third indication information and requests the second network device to send the first time information.

By way of example, and not limitation, the third indication information includes the configuration information of the RACH resource and/or the configuration information of the preamble. In other words, the information A2 is a msg 1 of a random access process, and a resource of the msg 1 used to request the first time information of the second network device is configured in the third indication information for the terminal device.

By way of example, and not limitation, the first time information is carried in a first system message (system information block, SIB) sent by the second network device. In other words, the second information sent by the second network device is a system message.

For example, the second information is carried in a SIB 9 sent by the second network device, and the sixth information sent by the second network device to the first network device includes scheduling information of a system message of the second network device. The first network device generates the first information based on the received sixth information, where the first information includes the scheduling information.

Optionally, the scheduling information includes the first indication information, where the first indication information includes a first time interval, and the first time interval is used by the terminal device to determine the first resource (namely, a resource on which the second network device sends the first time information). For example, the first time interval exists between the first resource and a resource carrying the first information. After receiving the first information, the terminal device receives the first time information on the first resource, where the first time interval exists between the first resource and the resource carrying the first information.

Optionally, the scheduling information includes the first indication information, where the first indication information includes a second time interval, and the second time interval is a time interval at which the terminal device receives the system message sent by the second network device. For example, the second time interval is referred to as a system information window (SI window), and the SI window includes the first resource (namely, a resource used by the second network device to send the SIB 9 including the first time information). The SI window further includes a resource used by the second network device to send another system message (namely, a system message other than the SIB 9). In other words, the scheduling information of the system message indicates scheduling of at least one system message sent by the second network device. This is not limited in embodiments described herein. For example, the scheduling information is written as "SI-SchedulingInfo". This is not limited in embodiments described herein.

Optionally, the first indication information further includes a first periodicity, and the first periodicity is a periodicity of the second time interval. In other words, a resource in the second time interval is a periodic resource whose periodicity is the first periodicity. Optionally, the first indication information further includes a scheduling list of the system message of the second network device, and/or a sequence number of the SIB 9 in the scheduling list of the at least one system message of the second network device.

The terminal device determines, based on the first indication information, the first resource on which the second network device sends the SIB 9.

Optionally, the third indication information is used to configure a request message of the terminal device to request the system message of the second network device. For example, the third indication information is written as "SI-RequestConfig". This is not limited embodiments described herein.

The first information further includes the second indication information. In response to the second indication information indicating that the second network device does not send the SIB 9 in the system information window, and the first information including the third indication information, after receiving the first information, the terminal device determines that the second network device does not periodically send or does not actively send the SIB 9, but that a resource for requesting the first time information is configured for the terminal device based on the third indication information. The terminal device generates the information A2 based on the configuration information of the request message, and send the information A2 to the second network device, to request the first time information of the second network device.

Alternatively, in response to the second indication information indicating that the second network device does not send the SIB 9, and the first information not including the third indication information, after receiving the first information, the terminal device determines that the second network device does not periodically send or actively send the SIB 9, and that a resource used for sending the request information is not configured. In this case, the terminal device initiates a random access process to the second network device. To be specific, the terminal device first sends a msg 1 of the random access process, and sends a msg 3 to the second network device after receiving a random access response message msg 2 sent by the second network device, where the msg 3 includes the information A1, to request the first time information of the second network device.

Manner 2

S240: The terminal device sends information B (namely, another example of fifth information) to the first network device, where the information B indicates that the terminal device requests the first time information of the second network device.

By way of example, and not limitation, the information B is carried in a message (for example, a msg 1 or a msg 3) sent by the terminal device in a random access process, or the information B is carried in uplink control information sent by the terminal device.

Optionally, the information B is carried in an SRB 1. In other words, the terminal device sends the information B to the first network device through the SRB 1.

Optionally, the first information includes the sixth indication information, where the sixth indication information indicates the terminal device to request, to the first network device by using the dedicated signaling, the first time information sent by the second network device. After receiving the first information, in response to the terminal device determining to request, to the first network device by using the dedicated signaling, the first time information sent by the second network device, the terminal device sends the information B to the first network device through the SRB 1.

After receiving the information B, the first network device determines that the terminal device requests the second network device to send the first time information, and performs S241.

S241: The first network device sends seventh information to the second network device, where the seventh information indicates that the terminal device requests the first time information of the second network device.

The second network device receives the seventh information from the first network device.

S250: The second network device determines that the terminal device requests the first time information.

After receiving the information A, the information A1, or the information A2 sent by the terminal device, the second network device determines that the terminal device requests the time information of the second network device. Alternatively, after receiving the seventh information sent by the first network device, the second network device determines that the terminal device requests the first time information of the second network device.

S260: The second network device sends the first time information to the terminal device.

In other words, the second network device sends the second information, where the second information includes the first time information.

Optionally, the sixth information and/or the first information include/includes the fifth indication information, where the fifth indication information indicates the terminal device to receive the first time information by using the dedicated signaling. In this case, the second network device sends the first time information to the terminal device by using the dedicated signaling. By way of example, and not limitation, the dedicated signaling is sent through an SRB 3. Optionally, the dedicated signaling is an RRC message or a MAC CE.

Optionally, the second network device periodically sends the first time information, include the first indication information in the sixth information sent in S210, and notify, via the first network device, the terminal device of the first resource for sending the first time information and/or a periodicity for sending the first time information. In this way, after performing S230, the terminal device determines the first resource based on the first information sent by the first network device, and performs S260 (in other words, S240, S241, and S250 are optional steps). The terminal device receives, on the first resource, the first time information sent by the second network device.

Optionally, the second network device does not actively send the second information. After receiving the information A, the information A1, or the information A2 sent by the terminal device in S240, the second network device sends the first time information to the terminal device. Alternatively, after receiving the seventh information sent by the first network device in S250, the second network device sends the second information to the terminal device. The terminal device obtains, based on the received second information, the time information of the second network device.

For example, after receiving the information A sent by the terminal device through the SRB 3, the second network device determines that the terminal device requests the first time information, and the second network device sends the first time information to the terminal device.

For another example, the second network device broadcasts the first time information based on a system message. For example, the second network device broadcast the first time information based on a SIB 9. After receiving the information A1 (msg 3) or the information A2 (msg 1) sent by the terminal device in the random access process, in response to the second network device determining that the terminal device requests the network device to send the SIB 9, the second network device sends the SIB 9 to the terminal device on the first resource, and the terminal device receives the SIB 9 on the first resource, and determines the first time information carried in the SIB 9.

Sequence numbers of the processes do not mean execution sequences in the foregoing embodiments. The execution sequences of the processes should be determined based on functions and internal logic of the processes, and should not be construed as any limitation on the implementation processes of at least one embodiment. Therefore, in at least one embodiment, some or all of the steps are selected for implementation. This is not limited in embodiments described herein.

According to the foregoing solution, the terminal device receives time information from another network device based on an indication of the first network device to which the terminal device establishes a wireless connection. In this way, the terminal device obtains higher-precision time information, thereby improving communication reliability. Optionally, the terminal device is simultaneously connected to both the first network device and the second network device in a dual connectivity manner. The first network device is a master network device (for example, a master base station), and the second network device is a secondary network device (for example, a secondary base station). The terminal device receives time information from the secondary network device based on an indication of the master network device. In this way, the terminal device obtains higher-precision time information, thereby improving communication reliability. According to the optional implementations of the foregoing solution, In response to the second network device not periodically or actively sending the first time information, the terminal device further sends the request message based on the first information, to request the second network device to send the first time information. In this way, the terminal device obtains higher-precision time information, thereby improving communication reliability. In addition, the higher-precision time information obtained by the terminal device enables the terminal device to perform some communication services, for example, safe driving in vehicle-to-everything and safe production in industrial Internet, with high time precision.

Figure 4:
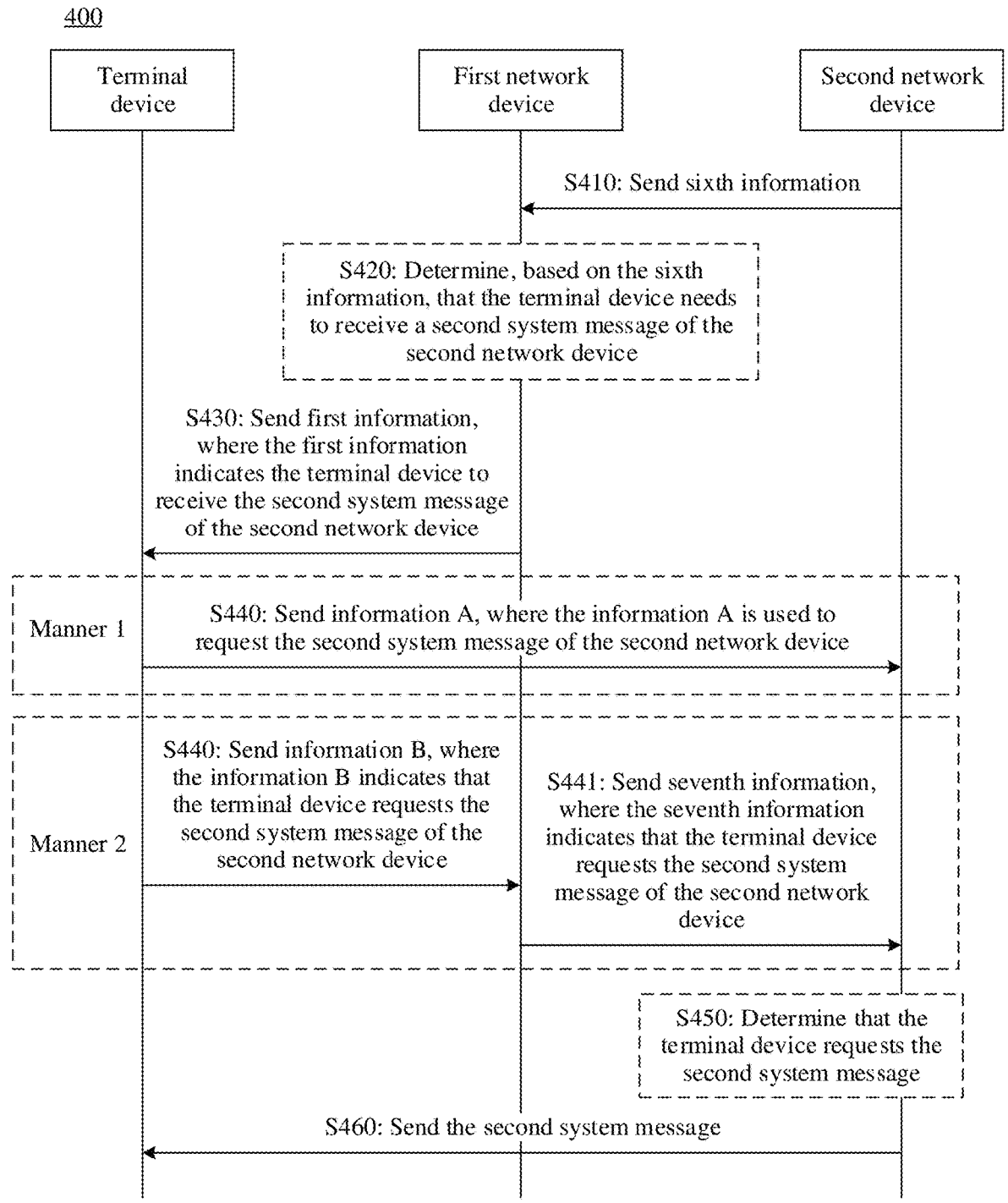
FIG. 4 is another example flowchart of a method for receiving and sending information provided in at least one embodiment.

The method provided in at least one embodiment is further used for receiving or sending the system message of the second network device. FIG. 4 is another example schematic flowchart of a method for receiving and sending information provided in at least one embodiment.

S410: A second network device sends sixth information to a first network device.

The first network device receives the sixth information from the second network device, where the sixth information indicates a terminal device to receive a second system message of the second network device. The second system message includes the foregoing first time information, or is another system message of the second network device. This is not limited embodiments described herein. Alternatively, the sixth information indicates that the second network device has the second system message.

Optionally, the sixth information includes but is not limited to one or more of the following information:
first indication information, indicating a first resource that carries the second system message;
second indication information, indicating whether the second network device broadcasts the second system message on a first resource;

third indication information, where the third indication information is configuration information of a request message, and the request message is used to request the second system message;

fourth indication information, indicating an identifier of the second network device and/or an identifier of a cell in which the second network device provides a service;

fifth indication information, indicating to receive the second system message by using dedicated signaling; or sixth indication information, indicating to request the second system message by using dedicated signaling.

By way of example, and not a limitation, the sixth message is carried in an X2 interface setup message or an Xn interface setup message.

The second network device notifies, based on the first indication information, the first network device of the first resource on which the second network device sends the second system message. In response to the sixth information including the first indication information, after receiving the first indication information via the first network device, the terminal device determines the first resource based on the first indication information, and receive the second system message on the first resource.

Optionally, in response to the sixth information including the first indication information, the sixth information further includes the second indication information. The second information indicates whether the second network device sends the second system message on the first resource indicated by the first indication information, so that after receiving the second indication information via the first network device, the terminal device determines whether the second network device sends the second system message on the first resource. In response to the second network device not sending the second system message on the first resource, the terminal device sends the request message, to request the first network device to send the second system message, so that the terminal device obtains the second system message on the first resource. For at least one embodiment, refer to related descriptions below. However, embodiments described here are not limited thereto.

Optionally, the sixth information includes the fourth indication information, so that after the first network device receives the fourth indication information or after the terminal device receives the fourth indication information via the first network device, the terminal device or the first network device determines an information source based on the identifier of the second network device and/or the identifier of the cell in which the second network device provides a service.

Optionally, the sixth information includes the fifth indication information and/or the sixth indication information. After receiving first information via the first network device, the terminal device determines, depending on whether the first information includes the fifth indication information and/or the sixth indication information, whether to receive or request the second system message by using the dedicated signaling. For at least one embodiment, refer to related descriptions below. However, embodiments described herein are not limited thereto.

According to the foregoing solution, the second network device provides assistance information for the terminal device to receive the second system message, so that the terminal device receives the second system message from the second network device.

S420: The first network device determines, based on the sixth information, that the terminal device receives the second system message of the second network device.

After receiving the sixth information, the first network device determines that the terminal device receives the second system message of the second network device. The first network device generates the first information based on the sixth information, where the first information indicates the terminal device to receive the second system message of the second network device.

The first information includes one or more of the first indication information, the second indication information, the third indication information, the fourth indication information, the fifth indication information, or the sixth indication information. For descriptions of indication information, refer to related descriptions in step S410. Details are not described herein again.

S430: The first network device sends the first information to the terminal device, where the first information indicates the terminal device to receive the second system message of the second network device.

In an implementation, the sixth information includes the first indication information. After receiving the first information, the terminal device performs S460 to receive the second system message sent by the second network device on the first resource indicated by the first indication information.

In another implementation, the terminal device determines to send the request message based on the first information, where the request message is used to request the second network device to send the second system message.

In at least one embodiment, the terminal device requests, in but not limited to the following two manners, the second network device to send the second system message.

Manner 1

S440: The terminal device sends information A to the second network device, where the information A is used to request the second system message of the second network device.

In an implementation, the terminal device sends the information A to the second network device through an SRB 3. In other words, the information A is carried on an SRB 3 of the terminal device.

Optionally, the first information includes the sixth indication information, where the sixth indication information indicates the terminal device to request the second system message from the second network device by using the dedicated signaling. The terminal device sends the information A to the second network device based on the sixth indication information through the SRB 3, to request the second network device to send the second system message. In other words, the information A is the dedicated signaling sent by the terminal device.

In another implementation, the terminal device requests, based on a message 3 (msg 3) of a random access process, the second network device to send the second system message.

In other words, the information A is carried in a msg 3 of a random access process initiated by the terminal device to the second network device.

For example, after receiving the first information, in response to the terminal device determining to receive the second system message of the second network device, the terminal device initiates the random access process to the second network device, and includes the information A in the msg 3 of the random access process, to request the second network device to send the second system message.

In another implementation, the first information includes the third indication information, where the third indication information configures a resource for the terminal device to send the request message. After receiving the first information, the terminal device generates, based on the third indication information, the request message, namely, the information A, and sends the information A to the second network device, to request the second network device to send the second system message.

Optionally, the third indication information includes configuration information of a RACH resource and/or configuration information of a preamble, and the information A is the preamble that is sent on the RACH resource. After receiving the preamble that is sent on the RACH resource, the second network device determines that the terminal device requests the second system message.

In another implementation, the first information includes the first indication information and/or the second indication information. Based on an indication of the first indication information and/or the second indication information, the terminal device determines steps for obtaining the second system message of the second network device.

The terminal device determines, based on the second indication information in the first information, whether the second network device sends the second system message.

Optionally, the second indication information indicates that the second network device sends the second system message. The terminal device determines, based on the first indication information, the first resource on which the second network device sends the second system message, and performs S460, to receive the second system message sent by the second network device on the first resource.

Optionally, in response to the second indication information indicating that the second network device does not send the second system message, the following two possible implementations is included.

The second network device does not perform sending mentioned according to at least one embodiment is understood as that the second network device does not periodically perform sending or does not actively perform sending. However, embodiments described herein are not limited thereto.

Possibility 1

The second indication information indicates that the second network device does not send the second system message. In other words, the second indication information indicates that the second network device does not send the first time information. The terminal device sends information A1 to the second network device.

By way of example, and not limitation, the information A1 is carried in a msg 3 of a random access process. After the terminal device determines, based on the second indication information, that the second network device does not send the second system message, the terminal device initiates the random access process to the second network device, where the information A1 is carried in the msg 3 of the random access process, to request the network device to send the second system message.

Optionally, in response to the second indication information indicating that the second network device does not send the second system message, and the first information does not include the third indication information, the terminal device sends the information A1. To be specific, after receiving the first information, the terminal device determines, based on the result indicated by the second indication information, that the second network device periodically or actively sends the second system message. Further, the terminal device determines whether the first information includes the third indication information. In response to the first information not including the third indication information, the terminal device sends the information A1 to the second network device, to request the network device to send the second system message.

Possibility 2

In response to the second indication information indicating that the second network device does not send the second system message, and the first information includes the first indication information, the terminal device sends information A2.

In response to a result indicated by the second indication information being "no", the terminal device determines that the second network device periodically or actively sends the second system message. Further, the terminal device determines whether the first information includes the third indication information. In response to the first information including the third indication information, the terminal device sends the information A2 based on the third indication information, to request the network device to send the second system message.

Optionally, the third indication information is used to configure the request message of the terminal device to request the system message of the second network device. For example, the third indication information is written as "SI-RequestConfig". This is not limited embodiments described herein.

By way of example, and not limitation, the third indication information includes the configuration information of the RACH resource and/or the configuration information of the preamble. In other words, the information A2 is a msg 1 of a random access process, and a resource of the msg 1 used to request the first time information of the second network device is configured in the third indication information for the terminal device.

The first information includes scheduling information of the system message of the second network device, and the scheduling information includes the first indication information.

Optionally, the scheduling information includes the first indication information, where the first indication information includes a first time interval, and the first time interval is used by the terminal device to determine the first resource (namely, a resource on which the second network device sends the second system message).

Optionally, the scheduling information includes the first indication information, where the first indication information includes a second time interval, and the second time interval is a time interval at which the terminal device receives the system message of the second network device. For example, the second time interval is referred to as a system information window (SI window), and the SI window includes the first resource. The SI window further includes a resource used by the second network device to send another system message (namely, a system message other than a SIB 9). In other words, the scheduling information of the system message indicates scheduling of at least one system message sent by the second network device. This is not limited embodiments described herein. For example, the scheduling information is written as "SI-SchedulingInfo". This is not limited embodiments described herein.

Optionally, the first indication information further includes a first periodicity, and the first periodicity is a periodicity of the second time interval. In other words, a resource in the second time interval is a periodic resource whose periodicity is the first periodicity. Optionally, the first indication information further includes a scheduling list of the system message of the second network device, and/or a sequence number of the second system message in the scheduling list of the at least one system message of the second network device. The terminal device determines, based on the first indication information, the first resource on which the second network device sends the second system message.

Manner 2

S440: The terminal device sends information B to the first network device, where the information B indicates that the terminal device requests the second system message of the second network device.

By way of example, and not limitation, the information B is carried in a message (for example, a msg 1 or a msg 3) sent by the terminal device in a random access process, or the information B is carried in uplink control information sent by the terminal device.

Optionally, the information B is carried in an SRB 1. In other words, the terminal device sends the information B to the first network device through the SRB 1.

Sequence numbers of the processes do not mean execution sequences in the foregoing embodiments. The execution sequences of the processes should be determined based on functions and internal logic of the processes, and should not be construed as any limitation on the implementation processes of at least one embodiment. Therefore, in at least one embodiment, some or all of the steps are selected for implementation. This is not limited embodiments described herein.

According to the foregoing solution, the terminal device receives a second system message from another network device based on an indication of the first network device to which the terminal device establishes a wireless connection, to enable the terminal device to obtain the second system message from the another network device. Optionally, the terminal device is simultaneously connected to both the first network device and the second network device in a dual connectivity manner. The first network device is a master network device (for example, a master base station), and the second network device is a secondary network device (for example, a secondary base station). The terminal device receives a system message from the secondary network device based on an indication of the master network device. In this way, the terminal device obtains a second system message of the secondary network device, thereby improving communication reliability. According to the optional implementations of the foregoing solution, in response to the second network device not periodically or actively sending the second system message, the terminal device further sends the request message based on the first information, to request the second network device to send the second system message. In this way, the terminal device obtains the second system message.

Figure 5:
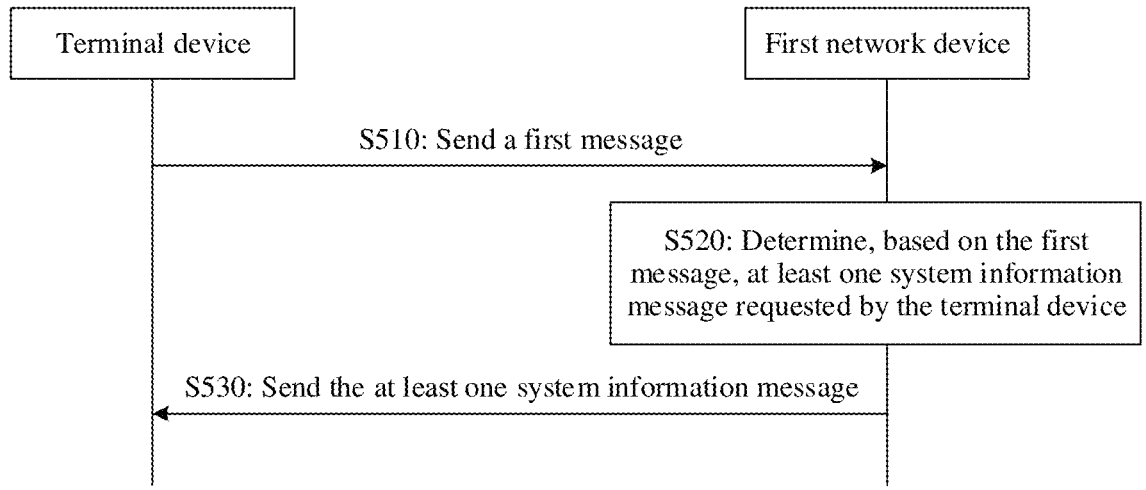
FIG. 5 is another example flowchart of a method for receiving and sending information provided in at least one embodiment.

The method provided in at least one embodiment is further used for receiving or sending the system message of the second network device. FIG. 5 is another example schematic flowchart of a method for receiving and sending information provided in at least one embodiment.

S510: A terminal device sends a first message to a first network device, where the first message is used to request an eighth system information of the first network device.

The first network device receives the first message from the terminal device.

The eighth system information includes at least one system information block used by the terminal device.

Optionally, the first message is carried in a message 3 (msg 3) of a random access process initiated by the terminal device to the first network device. By way of example, and not limitation, the first message is written as "RRCSystemInfoRequest".

In at least one embodiment, the first message includes seventh indication information, where the seventh indication information indicates at least one system information message used by the terminal device, and the at least one system information message includes the at least one system information block used by the terminal device.

Optionally, the seventh indication information indicates the at least one system information message used by the terminal device.

Optionally, the seventh indication information includes a bit map (bit map), and a bit in the bit map corresponds to one system information message.

By way of example, and not limitation, in response to a bit in the bit map in the seventh indication information being set to "1", a system information message corresponding to the bit is requested by the terminal device; or by contrast, in response to a bit being set to "0", a system information message corresponding to the bit is requested by the terminal device.

In at least one embodiment, the first message includes eighth indication information, where the eighth indication information indicates whether a type of a system message requested by the terminal device is a third system message. Alternatively, the eighth indication information indicates whether a type of a system message requested by the terminal device is a third system message or a fourth system message.

The third system message is a positioning-related system message, and the third system message includes one or more system information blocks, for example, a system information block including positioning assistance information. The third system message is written as "posSIB". In response to the third system message including a plurality of positioning-related system information blocks, the system information blocks is numbered. For example, the system information blocks is written as "posSIB 1", "posSIB 2", and the like. However, embodiments described herein are not limited thereto.

The fourth system message is a system message other than the third system message. For example, the fourth system message includes system information such as a system information block 2 (SIB 2) of cell reselection information or a system information block 3 (SIB 3) of cell reselection-related information.

In response to the eighth indication information indicating that the type of the system message requested by the terminal device is the third system message, the bit map in the seventh indication information corresponds to system information messages in a first scheduling list. The first scheduling list is used to schedule a system information message of the third system message type. The bit map sequentially corresponds to the system information messages in the first scheduling list, to be specific, the first bit corresponds to the first system information message in the scheduling list, the second bit corresponds to the second system information message in the scheduling list, and so on.

In response to the eighth indication information indicating that the type of the system message requested by the terminal device is the fourth system message, the bit map in the seventh indication information corresponds to system information messages in a second scheduling list. The second scheduling list is used to schedule a system information message of the fourth system message type. The bit map sequentially corresponds to system information blocks in the second scheduling list, to be specific, the first bit corresponds to the first system information message in the scheduling list, the second bit corresponds to the second system information message in the scheduling list, and so on.

Optionally, the eighth indication information includes one bit, where the bit indicates whether the type of the system message requested by the terminal device is the third system message. For example, in response to the bit indicating "1", the system message requested by the terminal device is the third system message; or in response to the bit indicating "0", the system message requested by the terminal device is the third system message.

Optionally, 12 reserved bits in system message request information (RRCSystemInfoRequest) of an existing NR system indicates whether the type of the system message requested by the terminal device is the third system message. Alternatively, the 12 reserved bits indicate whether the type of the system information block requested by the terminal device is the third system message or the fourth system message.

For example, in response to the 12 bits in the RRCSystemInfoRequest all being set to "1", the type of the system message requested by the terminal device is the third system message. Alternatively, in response to some of the 12 bits in the RRCSystemInfoRequest being set to "1", the type of the system message requested by the terminal device is the fourth system message. However, embodiments described herein are not limited thereto.

In another implementation, the first message includes ninth indication information, where the ninth indication information indicates a bit that is in the seventh indication information and that indicates an information block in the third system message, and/or the ninth indication information indicates a bit that is in the seventh indication information and that indicates an information block in the fourth system message.

By way of example, and not limitation, the ninth indication information includes N bits, and four bits indicate K, where K is greater than 0 and less than or equal to $2^N$. In this case, the ninth indication information indicates that the first K bits in the seventh indication information correspond to the first scheduling list, and other bits in the seventh indication information correspond to the second scheduling list. To be specific, the first K bits indicate whether the terminal device requests the first K system information messages in the first scheduling list, and the last (N-K) bits indicate whether the terminal device requests the first (N-K) system information messages in the second scheduling list. In other words, the first K bits of the seventh indication information indicate the system information message of the third system message type requested by the terminal device, and other bits in the seventh indication information indicate the system information message of the fourth system message type requested by the terminal device.

Alternatively, by contrast, the ninth indication information indicates that the first K bits in the seventh indication information correspond to the second scheduling list, and other bits in the seventh indication information correspond to the first scheduling list. This is not limited embodiments described herein.

S520: The first network device determines, based on the first message, the at least one system information message requested by the terminal device.

After receiving the first message, the first network device determines, based on the eighth indication information in the first message, the system information message corresponding to the bit map of the seventh indication information. For example, the bit map corresponds to the system information message of the third system message; the bit map corresponds to the system information message of the fourth system message; or the bit map partially corresponds to the system information message of the third system message, and some bits correspond to the system information message of the fourth system message. The first network device then determines, based on the seventh indication information, one or more system information messages requested by the terminal device.

S530: The first network device sends the at least one system information message requested by the terminal device to the terminal device.

The terminal device receives the one or more system information messages sent by the first network device.

According to the foregoing solution, the terminal device and the first network device reach an agreement on the system information message requested by the terminal device, so that the first network device sends, to the terminal device, the system information message requested by the terminal device. Therefore, an error occurrence probability is reduced, and communication reliability is ensured.

The foregoing describes in detail the methods provided in at least one embodiment with reference to FIG. 2 to FIG. 5. The following describes in detail apparatuses provided in at least one embodiment with reference to FIG. 6 to FIG. 8.

Figure 6:
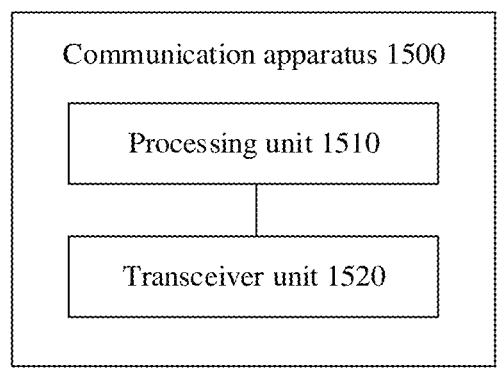
FIG. 6 is a schematic block diagram of an example of a communication apparatus applicable to at least one embodiment.

FIG. 6 is a schematic block diagram of a communication apparatus according to at least one embodiment. As shown in FIG. 6, a communication apparatus 1500 includes a processing unit 1510 and a transceiver unit 1520.

In at least one embodiment, the communication apparatus 1500 corresponds to the terminal device in the foregoing method embodiments, for example, is a terminal device or a chip disposed in the terminal device.

The communication apparatus 1500 corresponds to the terminal device in the methods 200, 300, 400, and 500 according to at least one embodiment. The communication apparatus 1500 includes units configured to perform the methods performed by the terminal device in the methods 200, 300, 400, and 500 in FIG. 2, FIG. 3, FIG. 4, and FIG. 5. In addition, the units in the communication apparatus 1500 and the foregoing other operations and/or functions are used to implement corresponding procedures of the methods 200, 300, 400, and 500 in FIG. 2, FIG. 3, FIG. 4, and FIG. 5.

In response to the communication apparatus 1500 being configured to perform the method 200 in FIG. 2, the transceiver unit 1520 is configured to perform S230, S240, and S260 in the method 200. In response to the communication apparatus 1500 being configured to perform the method 300 in FIG. 3, the transceiver unit 1520 is configured to perform S230, S240, and S260 in the method 300, and the processing unit 1510 is configured to perform S231 in the method 300. In response to the communication apparatus 1500 being configured to perform the method 400 in FIG. 4, the transceiver unit 1520 is configured to perform S430, S440, and S460 in the method 400. In response to the communication apparatus 1500 being configured to perform the method 500 in FIG. 5, the transceiver unit 1520 is configured to perform S510 and S530 in the method 500. A process in which the units perform the foregoing corresponding steps is described in detail in the foregoing method embodiments. For brevity, details are not described herein again.

Figure 7:
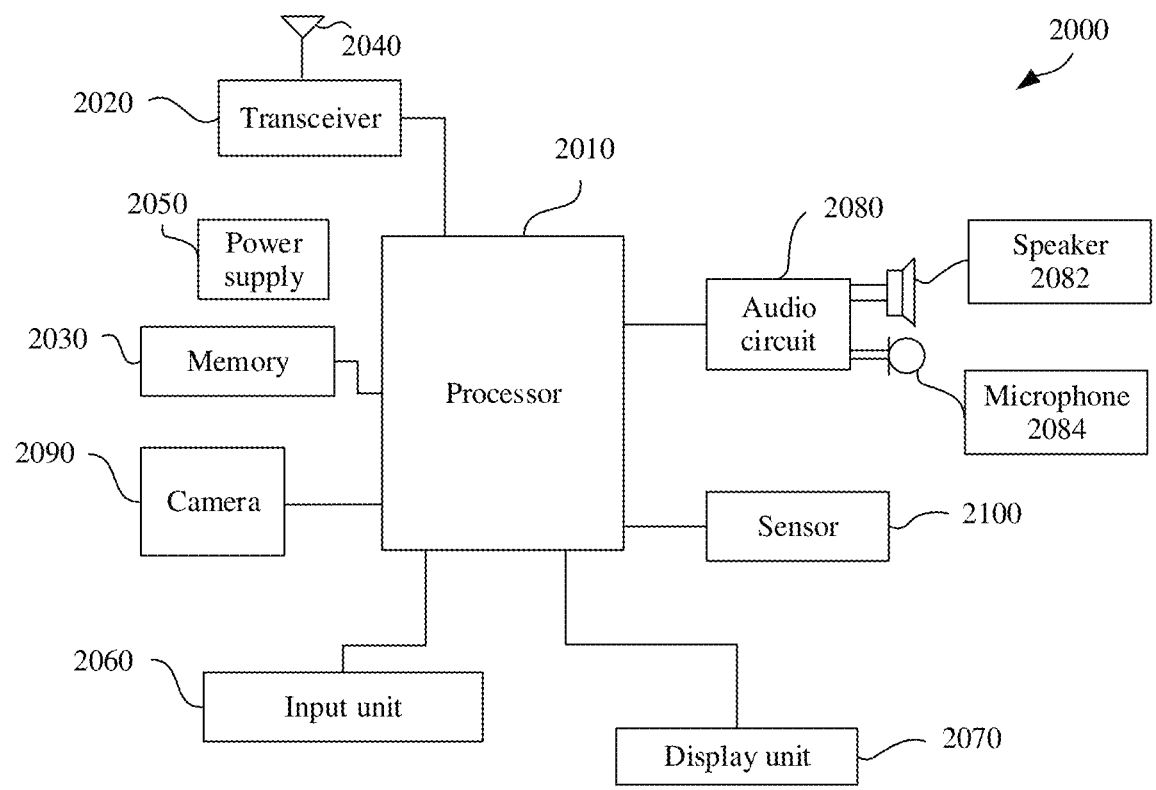
FIG. 7 is a schematic diagram of a structure of an example of a terminal device applicable to at least one embodiment.

In response to the communication apparatus 1500 being a terminal device, the transceiver unit 1520 in the communication apparatus 1500 corresponds to the transceiver 2020 in the terminal device 2000 shown in FIG. 7, and the processing unit 1510 in the communication apparatus 1500 corresponds to the processor 2010 in the terminal device 2000 shown in FIG. 7.

In response to the communication apparatus 1500 being a terminal device, the transceiver unit 1520 in the communication apparatus 1500 is implemented by using a communication interface (for example, a transceiver or an input/output interface). For example, the transceiver unit 1520 corresponds to the transceiver 2020 in the terminal device 2000 shown in FIG. 7. The processing unit 1510 in the communication apparatus 1500 is implemented by using at least one processor. For example, the processing unit 1510 corresponds to the processor 2010 in the terminal device 2000 shown in FIG. 7. Further, the processing unit 1510 in the communication apparatus 1500 is implemented by using at least one logical circuit.

Optionally, the communication apparatus 1500 further includes a processing unit 1510. The processing unit 1510 is configured to process instructions or data, to implement a corresponding operation.

Optionally, the communication apparatus 1500 further includes a storage unit. The storage unit is configured to store instructions or data. The processing unit invokes the instructions or the data stored in the storage unit, to implement a corresponding operation.

A process in which the units perform the foregoing corresponding steps is described in detail in the foregoing method embodiments. For brevity, details are not described herein again.

In at least one embodiment, the communication apparatus 1500 corresponds to the network device in the foregoing method embodiments, for example, is a network device or a chip disposed in the network device.

The communication apparatus 1500 corresponds to the first network device in the methods 200, 300, 400, and 500 according to at least one embodiment. The communication apparatus 1500 includes units configured to perform the methods performed by the first network device in the methods 200, 300, 400, and 500 in FIG. 2, FIG. 3, FIG. 4, and FIG. 5. In addition, the units in the communication apparatus 1500 and the foregoing other operations and/or functions are used to implement corresponding procedures of the methods 200, 300, 400, and 500 in FIG. 2, FIG. 3, FIG. 4, and FIG. 5.

In response to the communication apparatus 1500 being configured to perform the method 200 in FIG. 2, the transceiver unit 1520 is configured to perform S210, S230, S240, and S241 in the method 200, and the processing unit 1510 is configured to perform S220 in the method 200. In response to the communication apparatus 1500 being configured to perform the method 300 in FIG. 3, the transceiver unit 1520 is configured to perform S210 and S230 in the method 300, and the processing unit 1510 is configured to perform S220 in the method 200. In response to the communication apparatus 1500 being configured to perform the method 400 in FIG. 4, the transceiver unit 1520 is configured to perform S410, S430, S440, and S441 in the method 400, and the processing unit 1510 is configured to perform S420 in the method 400. In response to the communication apparatus 1500 being configured to perform the method 500 in FIG. 5, the transceiver unit 1520 is configured to perform S510 and S530 in the method 500, and the processing unit 1510 is configured to perform S520 in the method 500. A process in which the units perform the foregoing corresponding steps is described in detail in the foregoing method embodiments. For brevity, details are not described herein again.

The communication apparatus 1500 corresponds to the second network device in the methods 200, 300 and 400 according to at least one embodiment. The communication apparatus 1500 includes units configured to perform the methods performed by the second network device in the methods 200, 300 and 400 in FIG. 2, FIG. 3, and FIG. 4. In addition, the units in the communication apparatus 1500 and the foregoing other operations and/or functions are used to implement corresponding procedures of the methods 200, 300, and 400 in FIG. 2, FIG. 3, and FIG. 4.

In response to the communication apparatus 1500 being configured to perform the method 200 in FIG. 2, the transceiver unit 1520 is configured to perform S210, S240, and S260 in the method 200, and the processing unit 1510 is configured to perform S250 in the method 200. In response to the communication apparatus 1500 being configured to perform the method 300 in FIG. 3, the transceiver unit 1520 is configured to perform S210, S240 and S260 in the method 300, and the processing unit 1510 is configured to perform S250 in the method 200. In response to the communication apparatus 1500 being configured to perform the method 400 in FIG. 4, the transceiver unit 1520 is configured to perform S410, S440, S441, and S460 in the method 400, and the processing unit 1510 is configured to perform S450 in the method 400. A process in which the units perform the foregoing corresponding steps is described in detail in the foregoing method embodiments. For brevity, details are not described herein again.

Figure 8:
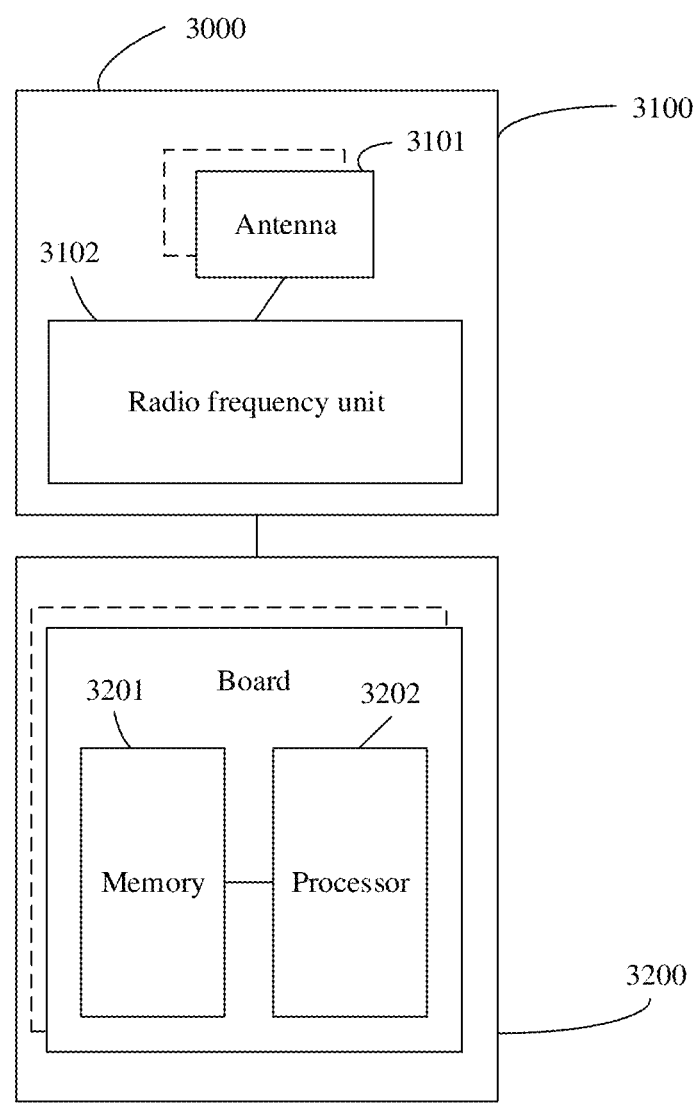
FIG. 8 is a schematic diagram of a structure of an example of a network device applicable to at least one embodiment.

In response to the communication apparatus 1500 being a network device, the transceiver unit in the communication apparatus 1500 corresponds to the transceiver 3100 in the network device 3000 shown in FIG. 8, and the processing unit 1510 in the communication apparatus 1500 corresponds to the processor 3202 in the network device 3000 shown in FIG. 8.

Optionally, the communication apparatus 1500 further includes a processing unit 1510. The processing unit 1510 is configured to process instructions or data, to implement a corresponding operation.

Optionally, the communication apparatus 1500 further includes a storage unit. The storage unit is configured to store instructions or data. The processing unit invokes the instructions or the data stored in the storage unit, to implement a corresponding operation.

A process in which the units perform the foregoing corresponding steps is described in detail in the foregoing method embodiments. For brevity, details are not described herein again.

In response to the communication apparatus 1500 being a network device, the transceiver unit 1520 in the communication apparatus 1500 is implemented by using a communication interface (for example, a transceiver or an input/output interface). For example, the transceiver unit 1520 corresponds to the transceiver 3100 in the network device 3000 shown in FIG. 8. The processing unit 1510 in the communication apparatus 1500 is implemented by using at least one processor. For example, the processing unit 1510 corresponds to the processor 3202 in the network device 3000 shown in FIG. 8. The processing unit 1510 in the communication apparatus 1500 is implemented by using at least one logical circuit.

FIG. 7 is a schematic diagram of a structure of a terminal device 2000 according to at least one embodiment. The terminal device 2000 is used in the system shown in FIG. 1, to perform functions of the terminal device in the foregoing method embodiments. As shown in the figure, the terminal device 2000 includes a processor 2010 and a transceiver 2020. Optionally, the terminal device 2000 further includes a memory 2030. The processor 2010, the transceiver 2020, and the memory 2030 communicates through an internal connection path, to transfer a control signal and/or a data signal. The memory 2030 is configured to store a computer program. The processor 2010 is configured to invoke and run the computer program in the memory 2030, to control the transceiver 2020 to receive or send a signal. Optionally, the terminal device 2000 further includes an antenna 2040, configured to send, by using a radio signal, uplink data or uplink control signaling output by the transceiver 2020.

The processor 2010 and the memory 2030 is integrated into one processing apparatus. The processor 2010 is configured to execute program code stored in the memory 2030 to implement the foregoing functions. During implementation, the memory 2030 is alternatively integrated into the processor 2010, or is independent of the processor 2010. The processor 2010 corresponds to the processing unit in FIG. 6.

The transceiver 2020 corresponds to the transceiver unit in FIG. 6. The transceiver 2020 includes a receiver (which is also referred to as a receiver machine or a receiver circuit) and a transmitter (which is also referred to as a transmitter machine or a transmitter circuit). The receiver is configured to receive a signal, and the transmitter is configured to transmit a signal.

The terminal device 2000 shown in FIG. 7 implements processes related to a terminal device in the method embodiments shown in FIG. 2, FIG. 3, and FIG. 4. Operations and/or functions of the modules in the terminal device 2000 are intended to implement the corresponding procedures in the foregoing method embodiments. For details, refer to the descriptions in the foregoing method embodiments. To avoid repetition, detailed descriptions are properly omitted herein.

The processor 2010 is configured to perform an action that is implemented inside the terminal device and that is described in the foregoing method embodiments. The transceiver 2020 is configured to perform a sending action by the terminal device for the network device or a receiving operation by the terminal device from the network device in the foregoing method embodiments. For details, refer to the descriptions in the foregoing method embodiments. Details are not described herein again.

Optionally, the terminal device 2000 further includes a power supply 2050, configured to supply power to various components or circuits in the terminal device.

In addition, to improve the functions of the terminal device, the terminal device 2000 further includes one or more of an input unit 2060, a display unit 2070, an audio circuit 2080, a camera 2090, a sensor 2100, and the like, and the audio circuit further includes a speaker 2082, a microphone 2084, and the like.

FIG. 8 is a schematic diagram of a structure of a network device according to at least one embodiment. For example, FIG. 8 is a schematic diagram of a structure related to a network device.

The network device 3000 shown in FIG. 8 implements processes related to a network device in the method embodiments shown in FIG. 2, FIG. 3, and FIG. 4. Operations and/or functions of modules in the network device 3000 are intended to implement corresponding procedures in the foregoing method embodiments. For details, refer to the descriptions in the foregoing method embodiments. To avoid repetition, detailed descriptions are properly omitted herein.

The network device 3000 shown in FIG. 8 is merely an architecture of the network device, and should not constitute any limitation on embodiments described herein. The method provided in at least one embodiment is applicable to a network device in another architecture, for example, a network device including a CU, a DU, and an AAU. An architecture of the network device is not limited in embodiments described herein.

At least one embodiment further provides a processing apparatus, including a processor and an interface. The processor is configured to perform the method in any one of the foregoing method embodiments.

The processing apparatus is one or more chips. For example, the processing apparatus is a field programmable gate array (field programmable gate array, FPGA), an application-specific integrated circuit (application-specific integrated circuit, ASIC), a system-on-a-chip (system-on-a-chip, SoC), a central processing unit (central processor unit, CPU), a network processor (network processor, NP), a digital signal processor (digital signal processor, DSP), a microcontroller unit (microcontroller unit, MCU), a programmable logic device (programmable logic device, PLD), or another integrated chip.

In an implementation process, steps in the foregoing methods is implemented by using a hardware integrated logical circuit in the processor, or by using instructions in a form of software. The steps of the methods disclosed with reference to at least one embodiment is directly performed and completed by using a hardware processor, or is performed and completed by using a combination of hardware in the processor and a software module. The software module is located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor. To avoid repetition, details are not described herein again.

The processor in at least one embodiment is an integrated circuit chip, and has a signal processing capability. In an implementation process, steps in the foregoing method embodiments is implemented by using a hardware integrated logical circuit in the processor, or by using instructions in a form of software. The foregoing processor is a general-purpose processor, a digital signal processor (DSP), an application-specific integrated circuit (ASIC), a field programmable gate array (FPGA) or another programmable logic device, a discrete gate or a transistor logic device, or a discrete hardware component. The processor implements or performs the methods, steps, and logical block diagrams that are disclosed in at least one embodiment. The general-purpose processor is a microprocessor, or the processor is any conventional processor or the like. The steps of the methods disclosed with reference to at least one embodiment is directly performed and completed by using a hardware decoding processor, or is performed and completed by using a combination of hardware in the decoding processor and a software module. The software module is located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory in at least one embodiment is a volatile memory or a nonvolatile memory, or includes a volatile memory and a nonvolatile memory. The nonvolatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM), used as an external cache. By way of example but not limitative description, many forms of RAMs is used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM). The memory of the systems and methods described in this specification includes but is not limited to these and any memory of another proper type.

According to the methods provided in at least one embodiment, a computer program product is provided. The computer program product includes computer program code. In response to the computer program code being run on a computer, the computer is enabled to perform the methods in embodiments shown in FIG. 2, FIG. 3, and FIG. 4.

According to the method provided in at least one embodiment, a computer-readable medium is further provided. The computer-readable medium stores program code. In response to the program code being run on a computer, the computer is enabled to perform the methods in embodiments shown in FIG. 2, FIG. 3, and FIG. 4.

According to the method provided in at least one embodiment, a system is provided. The system includes the foregoing one or more terminal devices and the foregoing one or more network devices.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step is performed by the processing unit (the processor). For a function of a unit, refer to a corresponding method embodiment. There are one or more processors.

All or some of the foregoing embodiments are implemented by using software, hardware, firmware, or any combination thereof. In response to software being used to implement embodiments, all or a part of embodiments are implemented in a form of a computer program product. The computer program product includes one or more computer instructions. In response to the computer instructions being loaded and executed on a computer, the procedure or functions according to at least one embodiment are all or partially generated. The computer is a general-purpose computer, a dedicated computer, a computer network, or other programmable apparatuses. The computer instructions is stored in a computer-readable storage medium or is transmitted from a computer-readable storage medium to another computer-readable storage medium. For example, the computer instructions is transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium is any usable medium accessible by the computer, or a data storage device, for example, a server or a data center, integrating one or more usable media. The usable medium is a magnetic medium (for example, a floppy disk, a hard disk, or a magnetic tape), an optical medium (for example, a high-density digital video disc (digital video disc, DVD)), a semiconductor medium (for example, a solid-state drive (solid-state drive, SSD)), or the like.

The network device and the terminal device in the foregoing apparatus embodiments completely correspond to the network device and the terminal device in the method embodiments. A corresponding module or unit performs a corresponding step. For example, the communication unit (the transceiver) performs a receiving or sending step in the method embodiments, and a step other than the sending step and the receiving step is performed by the processing unit (the processor). For a function of a unit, refer to a corresponding method embodiment. There is one or more processors.

Terminologies such as "component", "module", and "system" used in this specification are used to indicate computer-related entities, hardware, firmware, combinations of hardware and software, software, or software being executed. For example, a component is, but is not limited to, a process that runs on a processor, a processor, an object, an executable file, an execution thread, a program, and/or a computer. As illustrated by using figures, both a computing device and an application that runs on the computing device is components. One or more components reside within a process and/or a thread of execution, and a component is located on one computer and/or distributed between two or more computers. In addition, these components is executed from various computer-readable media that store various data structures. For example, the components communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art is aware that, in combination with the examples described in embodiments disclosed in this specification, units and algorithm steps is implemented by electronic hardware or a combination of computer software and electronic hardware. Whether the functions are performed by hardware or software depends on particular applications and design constraint conditions of the technical solutions. A person skilled in the art is able to use different methods to implement the described functions for a particular application, but the implementation does not go beyond the scope embodiments described herein.

For the purpose of convenient and brief description, for a detailed working process of the foregoing system, apparatuses, and units, refer to a corresponding process in the foregoing method embodiments, and details are not described herein again.

In the several embodiments described herein, the disclosed system, apparatuses, and methods are implemented in other manners. For example, the described apparatus embodiments are merely examples. For example, division into the units is merely logical function division and is other division in actual implementation. For example, a plurality of units or components is combined or integrated into another system, or some features is ignored or not performed. In addition, the displayed or discussed mutual couplings or direct couplings or communication connections is implemented by using some interfaces. The indirect couplings or communication connections between the apparatuses or units is implemented in electronic, mechanical, or other forms.

The units described as separate parts may or may not be physically separate, and parts displayed as units may or may not be physical units, is located in one position, or is distributed on a plurality of network units. Some or all of the units are selected to achieve the objectives of the solutions of embodiments.

In addition, functional units in at least one embodiment is integrated into one processing unit, or the units exist alone physically, or two or more units are integrated into one unit.

In the foregoing embodiments, all or some of the functions of the functional units are implemented by using software, hardware, firmware, or any combination thereof. In response to software being used to implement embodiments, all or a part of embodiments are implemented in a form of a computer program product. The computer program product includes one or more computer instructions (programs). In response to the computer program instructions (programs) being loaded and executed on the computer, the procedure or functions according to embodiments described herein are all or partially generated. The computer is a general-purpose computer, a dedicated computer, a computer network, or other programmable apparatuses. The computer instructions are stored in a computer-readable storage medium or are transmitted from a computer-readable storage medium to another computer-readable storage medium. For example, the computer instructions are transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium is any usable medium accessible by the computer, or a data storage device, for example, a server or a data center, integrating one or more usable media. The usable medium is a magnetic medium (for example, a floppy disk, a hard disk, or a magnetic tape), an optical medium (for example, a DVD), a semiconductor medium (for example, a solid-state drive (solid-state drive, SSD)), or the like.

In response to the functions being implemented in the form of a software functional unit and sold or used as an independent product, the functions are stored in a computer-readable storage medium. Based on such an understanding, the technical solutions of are implemented in a form of a software product. The computer software product is stored in a storage medium, and includes several instructions for instructing a computer device (which is a personal computer, a server, a network device, or the like) to perform all or some of the steps of the methods described in at least one embodiment. The foregoing storage medium includes any medium that stores program code, such as a USB flash drive, a removable hard disk, a read-only memory (Read-Only Memory, ROM), a random access memory (Random Access Memory, RAM), a magnetic disk, or an optical disc.

The foregoing descriptions are merely examples of embodiments, but are not intended to limit the protection scope of embodiments described herein. Any variation or replacement readily figured out by a person skilled in the art within the technical scope disclosed herein fall within the protection scope of embodiments described herein. Therefore, the protection scope of embodiments described herein are subject to the protection scope of the claims.

What is claimed is:

1. A communication method, comprising:
   receiving first information from a first network device, wherein the first information indicates that a second network device has first time information, and the first time information includes at least one of coordinated universal time UTC information, global positioning system GPS time information, or local time information; and
   receiving the first time information from the second network device based on the first information;
   wherein precision of the first time information is higher than precision of second time information, and the second time information is time information of the first network device.

2. The method according to claim 1, wherein the first information further includes one or more of the following information:
   first indication information, indicating a first resource on which the second network device sends second information that carries the first time information;
   second indication information, indicating whether the second network device broadcasts the first time information on the first resource;
   third indication information, wherein the third indication information is configuration information of a request message, and the request message is used to request the first time information;
   fourth indication information, indicating an identifier of the second network device and/or an identifier of a cell in which the second network device provides a service;
   fifth indication information, indicating to receive the first time information by using dedicated signaling; or
   sixth indication information, indicating to request the first time information from the second network device by using the dedicated signaling.

3. The method according to claim 2, wherein the first information includes scheduling information of at least one system message of the second network device, the scheduling information includes the first indication information and/or the second indication information, and a first system message in the at least one system message includes the first time information.

4. The method according to claim 2, wherein the first information includes the second indication information, and the receiving the first time information from the second network device based on the first information includes:
   receiving the first time information from the second network device in response to a result indicated by the second indication information being "yes".

5. The method according to claim 2, wherein when a result indicated by the second indication information is "no", the method further comprises:
   sending third information to the second network device, wherein the third information is used to request the first time information, and the third information is carried in a message 3 of a random access process.

6. The method according to claim 2, wherein in response to a result indicated by the second indication information being "no" and the first information including the third indication information, the method further comprises:

sending third information based on the third indication information, wherein the third information is the request message.

7. The method according to claim 2, wherein the third indication information includes configuration information of a random access channel RACH resource and/or configuration information of a preamble, and the request message is the preamble that is sent on the RACH resource.

8. The method according to claim 1, wherein the method further comprises:
sending second information, wherein the second information is used to request the first time information.

9. The method according to claim 8, wherein the second information is carried on a signaling radio bearer 1, or the second information is carried on a signaling radio bearer 3.

10. An apparatus, comprising:
one or more processors; and
one or more non-transitory computer readable memories coupled to the one or more processors and storing programming to be executed by the one or more processors, the programming including instructions for:
receiving first information from a first network device, wherein the first information indicates that a second network device has first time information, and the first time information includes at least one of coordinated universal time UTC information, global positioning system GPS time information, or local time information; and
receiving the first time information from the second network device based on the first information.

11. The apparatus according to claim 10, wherein precision of the first time information is higher than precision of second time information, and the second time information is time information of the first network device.

12. The apparatus according to claim 11, wherein the first information further includes one or more of the following information:
first indication information, indicating a first resource that carries the first time information;
second indication information, indicating whether the second network device broadcasts the first time information on the first resource;
third indication information, wherein the third indication information is configuration information of a request message, and the request message is used to request the first time information;
fourth indication information, indicating an identifier of the second network device and/or an identifier of a cell in which the second network device provides a service;
fifth indication information, indicating to receive the first time information by using dedicated signaling; or
sixth indication information, indicating to request the first time information from the second network device by using the dedicated signaling.

13. The apparatus according to claim 12, wherein the first information includes scheduling information of at least one system message of the second network device, the scheduling information includes the first indication information and/or the second indication information, and a first system message in the at least one system message includes the first time information.

* * * * *